(12) United States Patent
Egawa et al.

(10) Patent No.: US 6,999,120 B1
(45) Date of Patent: *Feb. 14, 2006

(54) CMOS IMAGING DEVICE FOR AMPLIFYING AND FETCHING SIGNAL CHARGE

(75) Inventors: Yoshitaka Egawa, Yokohama (JP); Shinji Ohsawa, Ebina (JP); Yukio Endo, Yokohama (JP); Nobuo Nakamura, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1038 days.

This patent is subject to a terminal disclaimer.

(21) Appl. No.: 09/680,968

(22) Filed: Oct. 6, 2000

(30) Foreign Application Priority Data

Oct. 7, 1999 (JP) .................................. 11-286469

(51) Int. Cl.
*H04N 5/335* (2006.01)
(52) U.S. Cl. ....................................... 348/296; 348/302
(58) Field of Classification Search ................. 348/296
See application file for complete search history.

(56) References Cited

U.S. PATENT DOCUMENTS 5,166,800 A   11/1992  Mori et al.
5,894,325 A * 4/1999  Yonemoto ................... 348/302
5,933,189 A   8/1999  Nomura
6,507,365 B1 * 1/2003  Nakamura et al. .......... 348/296

* cited by examiner

*Primary Examiner*—David L. Ometz
*Assistant Examiner*—Heather R. Jones
(74) *Attorney, Agent, or Firm*—Oblon, Spivak, McClelland, Maier & Neustadt, P.C.

(57) ABSTRACT

Disclosed is a solid-state imaging device comprising pickup circuit formed by the arrangement of a unit cell in two dimensions, a plurality of reading lines provided in a horizontal direction corresponding to each pixel row in the pickup region to transmit the reading drive signal φREADi for driving each reading circuit of the unit cell of respectively corresponding pixel row, a vertical drive selection circuit configured to drive the reading circuit by selectively supplying the reading drive signal to these reading lines, and first row selection circuit and a second row selection circuit configured to control the vertical drive circuit so as to drive reading circuit of each pixel row on the basis of the first pulse and the second pulse φROREAD and φESREAD respectively. The solid-state imaging device is capable of controlling a minimum electric charge accumulation time in the photodiode to less than 1H (a horizontal cycle) and is capable of conducting an extremely high-speed shutter operation.

3 Claims, 18 Drawing Sheets

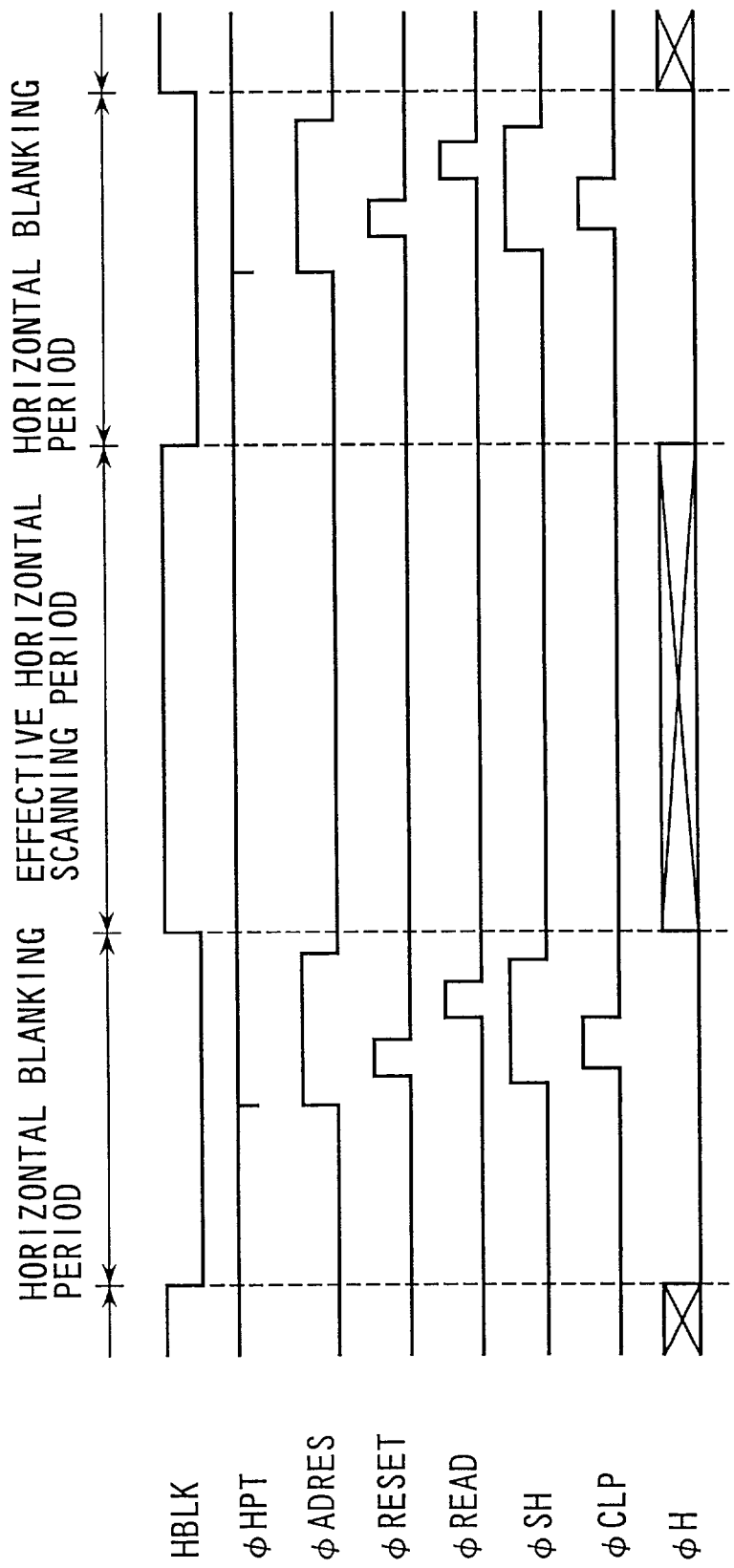

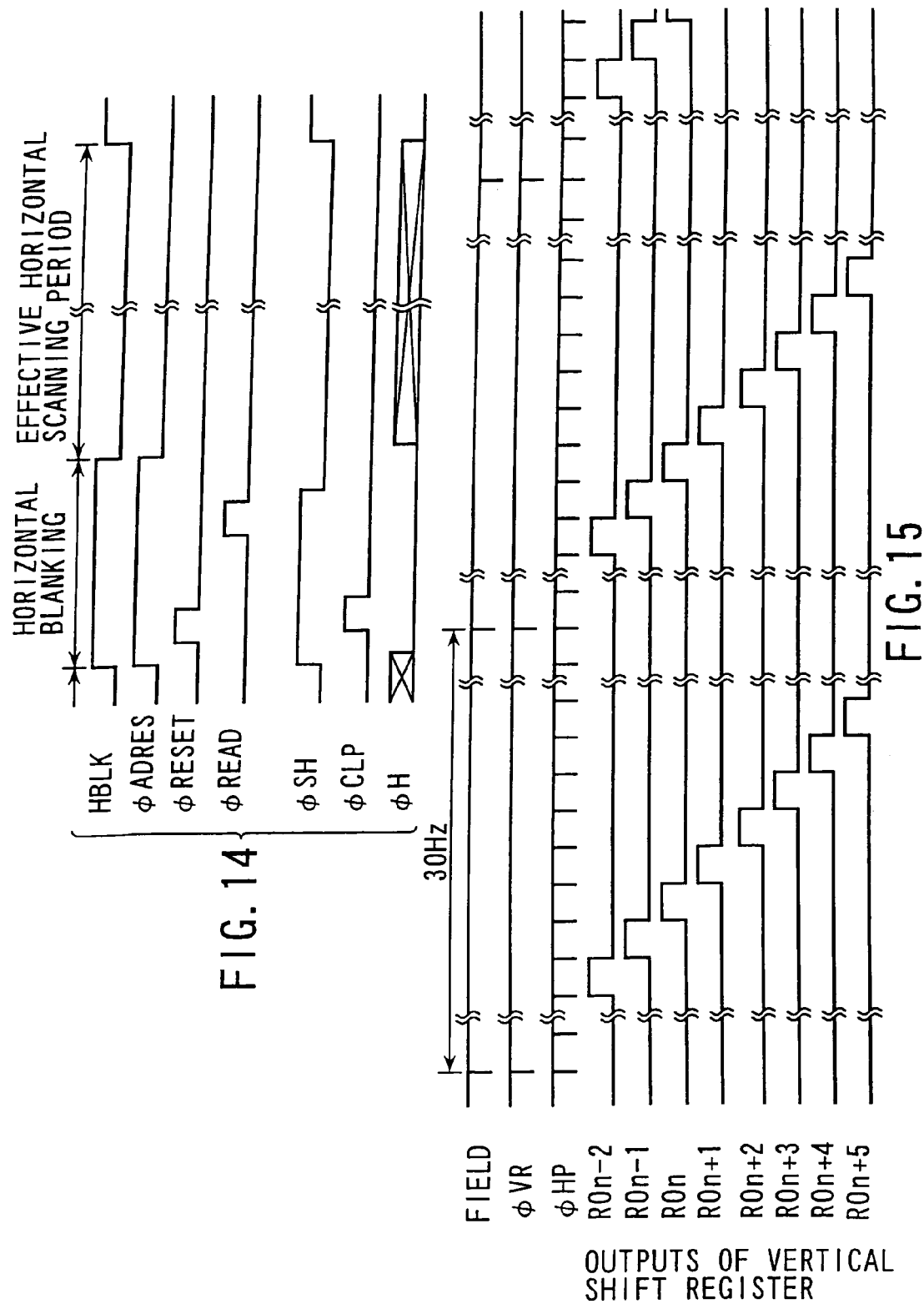

CMOS IMAGING DEVICE FOR AMPLIFYING AND FETCHING SIGNAL CHARGE

CROSS-REFERENCE TO RELATED APPLICATIONS

This application is based upon and claims the benefit of priority from the prior Japanese Patent Application No. 11-286469, filed Oct. 7, 1999, the entire contents of which are incorporated herein by reference.

BACKGROUND OF THE INVENTION

The present invention relates to an amplification type solid-state imaging device for amplifying and fetching a signal charge obtained with the photoelectric conversion circuit.

In recent years, as a solid-state imaging device suitable for the application to a video camera, an electronic still camera and the like, development of a CMOS solid-state image sensor is actively being made at various places. The CMOS solid-state image sensor has a structure for amplifying and fetching a signal obtained with the photoelectric conversion circuit for each cell in a MOS transistor. Specifically, the solid-state imaging sensor is an amplification type solid-state imaging sensor in which the inside of pixel is allowed to be provided with an amplification function by reading a signal charge generated by the photoelectric conversion circuit into the detection portion for detecting the electric load and amplifying the potential of this detection portion with an amplification transistor inside of the pixel. Since such amplification type solid-state imaging device is highly sensitive and suitable for a reduction of a pixel size by an increase in the number of pixels and reduction of the image size, so that the amplification type CMOS image sensor is more and more expected along with a low consumption electric power.

Here, FIG. 13 shows a circuit diagram of a conventional amplification type CMOS image sensor. In FIG. 13, a pickup region is arranged and formed in such a manner that one pixel unit of a unit cell is arranged in two-dimension matrix-like manner. Furthermore, each of the unit cells is formed of, for example, four transistors Ta, Tb, Tc and Td, and one photodiode PD. That is, each unit cell comprises a photodiode PD in which a ground potential is supplied to an anode side, a reading transistor Td having one side connected to a cathode side of the photodiode PD, an amplification transistor Tb having a gate connected to the other side of the reading transistor Td, a vertical selection transistor (a row selection transistor) Ta having one side connected to one side of the amplification transistor Tb, and a reset transistor Tc having one side connected to the gate of the amplification transistor Tb.

Furthermore, on a pickup region, there are formed a reading line 4 commonly connected to a gate of each reading transistor of a unit cell on the same line, a vertical selection line 6 commonly connected to a gate of each vertical selection transistor Ta of the unit cell on the same line, and a reset line 7 commonly connected to a gate of each reset transistor Tc of the unit cell on the same line corresponding to each pixel row. Furthermore, on the pickup region, there are formed a vertical signal line VLIN commonly connected to the other end side of each amplification transistor Tb of the unit cell on the same row, and a power source line 9 commonly connected to the other end side of each reset transistor Tc of the unit cell on the same line and the other end side of each vertical selection transistor Ta.

Outside of one end side of the pickup region, a plurality of load transistors TL's connected respectively between each one end side of the vertical signal line VLIN and the ground potential is arranged in a horizontal direction. On the other hand, outside of the other end sides of the pickup region, for example, a noise canceller circuit formed of, for example, two transistors TSH and TCLP and two capacitors Cc and Ct are formed is arranged in a horizontal direction for each of the pixel column. Furthermore, a horizontal selection transistor TH is connected respectively to each of the other end sides of the vertical selection signal line VLIN via these noise canceller circuits.

Furthermore, the horizontal signal line HLIN is commonly connected on each of the other ends of the horizontal selection transistor TH while a horizontal reset transistor (not shown) and an output amplification circuit AMP are connected to this horizontal signal line HLIN. Incidentally, the noise canceller circuit as described above comprises a sample holding transistor TSH having one end side connected to the other end side of the vertical signal line respectively, a coupling capacitor Cc having one end side connected to the other end side of the sample holding transistor TSH, an electric charge accumulation capacitor Ct connected between the other end side of the coupling capacitor Cc and the ground potential, and a potential clamp transistor TCLP connected to these two capacitors Cc and Ct. One end of the horizontal transistor TH is connected to the connection node of two capacitors Cc and Ct here.

Furthermore, outside of the pickup region, a vertical shift register 2 for selecting and controlling in a scanning manner a plurality of vertical selection lines 6 of the pickup region, a pulse selector 2a for driving in a scanning manner the vertical selection line 6 on each line of the pickup region, and a horizontal shift register 3 for driving in a scanning manner the horizontal selection transistor TH. Furthermore, a timing generation circuit 10 for generating each kind of pulse signal on the basis of the external input pulse signal and supplying the signal to a pulse sector 2a, a horizontal shift register 3 and a noise canceller circuit or the like, and a bias generation circuit 11 for generating a predetermined bias potential supplied to one end or the like of the potential clamp transistor TCLP of the noise canceller circuit is arranged outside of the pickup region.

FIG. 14 is a timing waveform diagram showing one example of an operation of a CMOS image sensor shown in FIG. 13. Next, by referring to FIG. 14, an operation of a conventional CMOS transistor will be explained.

A signal charge generated by photo-electrically converting incident light to each photodiode PD is accumulated in the photodiode PD. At the time of reading the signal charge accumulated in the photodiode PD from the unit cell for a desired one line portion in a horizontal blanking period, the vertical selection transistor Ta for one line portion is turned on by activating a signal (φADRESi (i= . . . , n, n+1) pulse) of the vertical selection line 6 on the line to be selected in synchronization with the vertical selection pulse signal φADRES in order to select each of the vertical selection lines 6. With respect to the unit cell for one line portion selected in this manner, a source follower circuit is operated which comprises a load transistor TL and an amplification circuit Tb to which a power source potential (for example, 3.3V) is supplied via the vertical selection transistor Ta.

Next in the selected unit cell for one line portion, the gate voltage of the amplification transistor Tb is reset to a reference voltage by activating a signal (φRESETi pulse) of the reset line 7 so as to be synchronized with the reset pulse signal φRESET with the result that the reference voltage is output to the vertical signal line VLIN for a definite period. However, a variation is present in the gate potential of the amplification transistor Tb of the unit cell for one line portion reset here with the result that the reset potential of the vertical signal line VLIN on the other end side becomes uneven.

Then, in order to eliminate the unevenness of the potential of each vertical signal line VLIN, a drive signal (φSH pulse) of the sample holding transistor TSH in the noise canceller is activated in advance. Furthermore, after the reference voltage is output to the vertical signal line VLIN, the drive signal (φCLP pulse) of the potential clamp transistor TCLP is activated for one definite time thereby setting the reference voltage to the connection node of the two capacitors Cc and Ct of the noise canceller circuit.

Next, after a signal of the reset line 7 is inactivated, the reading line 4 for a predetermined line is selected in synchronization with the reading pulse signal φREAD is selected, and the signal (φRREADi pulse) is activated with the result that the reading transistor Td is turned on, and the accumulation electric load of the photodiode PD is read to the gate of the amplification transistor Tb thereby changing the gate potential. The amplification transistor Tb outputs a signal voltage which corresponds to the change quantity of the gate potential to the corresponding vertical signal line VLIN and the noise canceller circuit.

After that, by turning off the φSH pulse in the noise canceller circuit, a signal component corresponding to a difference portion between the output reference voltage and the signal voltage, namely the signal voltage in which noise is cancelled is accumulated in the capacitor Ct for the electric charge accumulation until the corresponding horizontal selection transistor TH is activated. On the other hand, the pickup region and the noise canceller circuit are electrically separated by inactivating the signal of the vertical selection line 6, to turn off and control the vertical selection transistor Ta, and render the unit cell non-selective.

Subsequently, in the horizontal effective scanning period, after resetting by a horizontal reset signal HRS from the timing generation circuit 10, a shift operation of the horizontal shift register 3 is conducted in synchronization with a timing signal HCK and a drive signal (φH pulse) of the horizontal selection transistor TH is subsequently activated so that the horizontal selection transistor TH is subsequently turned on. In this manner, a connection node of the two capacitors Cc and Ct in the noise canceller circuit, namely, a signal voltage of the signal retention node is subsequently read to the horizontal signal line HLIN followed by being amplified with the output amplification circuit AMP to be output thereafter. Incidentally, the noise canceling operation described above is conducted for each of the reading operation of one horizontal line.

Generally, there is a tendency that the solid-state imaging device such as the CMOS image sensor or the like is used indoors and outdoors, or under various external light such as daylight and midnight. Consequently, there are many cases in which the exposure time is adjusted by controlling the electric charge accumulation time in the photodiode in accordance with a change in the external light or the like, and an operation of an electronic shutter operation is required for setting the sensitivity to an optimal state.

Here, FIG. 15 shows a timing waveform diagram of a vertical shift register in the conventional CMOS image sensor described above. An operation of the conventional CMOS image sensor will be further explained. Incidentally, in FIG. 15, there is shown a case in which the CMOS image sensor is operated in a 30 Hz VGA method of one field=1/30 Hz.

The φVR of 30 Hz and φHP of 15.7 Hz which are external input pulse signal are formed with a buffer circuit not shown to be input into the vertical shift register in the field cycle and the horizontal cycle respectively. The vertical shift register conducts the shift operation with the pulse signal φHP after clearing all the register output to set the register output to "L" level in the period in which the input of the φVR is on the "L" level thereby subsequently setting the output pulse signal ROi (i= . . . , n, n+1) to the "H" level to input the signal ROi to the pulse selector. The pulse selector activates a signal (φADESi pulse) of the vertical selection signal with respect to each selection line, a signal (φRESETi pulse) of the reset line, and a signal (φREADi pulse) of the reading line to scan the line to be selected.

In this manner, in the CMOS image sensor shown in FIG. 13, each output pulse ROi of the vertical shift register 2 for selecting and controlling a specific line to be selected in one field period is output only once. That is, the photodiode PD discharges an accumulation electric load only once to one field, and the operation of the electronic shutter cannot be conducted for adjusting exposure time by controlling the electric accumulation time of the photodiode.

On the other hand, in the case where, in addition to the vertical shift register for outputting an output pulse signal ROi described above, the vertical shift register for the electronic shutter is provided for selecting and controlling each pixel row prior to this vertical shift register; the signal accumulation time of the photodiode of each pixel row can be controlled on the basis of each output pulse signal from these two vertical shift register with the result that the operation of the electronic shutter is made possible. Here, FIG. 16 shows a circuit diagram of an amplification type CMOS image sensor in which the operation of the electronic shutter is made possible. FIG. 17 shows a timing waveform diagram of the vertical shift register.

In FIG. 16, to the vertical shift register 20 for the electronic shutter, the φES of 30 Hz and the φHP of 15.7 Hz which are external input pulses are input in the field cycle and in the horizontal cycle respectively. Upon receipt of the φES of 30 Hz and the φHP of 15.7 Hz, the vertical shift register 20 for the electronic shutter all clears the register output in the period in which the input of the pulse signal φES is set to a "L" level thereby setting the signal to the "L" level. After that, the shift operation is conducted with the pulse signal φHP to subsequently set the output pulse signal ESi (i= . . . , n, n+1) to input the signal to the pulse selector 2a.

The pulse selector 2a scans the pixel row of the pickup region so as to activate the signal (φRESETi pulse) of the reset line and the signal (φREADi pulse) of the reading line with respect to the pixel row in which the output pulse signal ROi and ESi from two vertical shift registers 2 and 20 are set to an "H" level. However, with respect to the signal (φADRESi pulse) of the vertical selection line, only the selection object line whose output pulse signal ROi from the reading vertical shift register 2 is set to an "H" level is activated and scanned.

In this manner, as shown in FIG. 17, the signal (φREADi pulse) of the reading line in each pixel row is activated twice within one field period with two vertical shift registers. That is, the signal accumulation timing and the signal reading timing can be set corresponding respectively to the output pulse signals ROi and ESi from the vertical shift register for the electronic shutter and from the vertical shift register for the reading vertical shift register with the result that the electronic shutter can be operated wherein the electronic accumulation time is controlled with the photodiode.

However, in this CMOS image sensor, there is a problem in that the electric charge accumulation time in the photodiode PD at the time of the operation of the electronic shutter can be controlled only in one H (horizontal cycle) unit. This results from the fact that a drive signal is output from the pulse selector 2a to the reading line 4 in synchronization with the reading pulse signal φREAD supplied from the timing generation circuit 10a both in the case of the signal accumulation timing and in the case of the signal reading timing. Here, FIG. 18 shows the timing waveform diagram of the pulse selector 2a. Hereinbelow, by referring to FIG. 18, the problem as described above will be further explained.

As shown in FIG. 18, the drive signal (φREADi (i= . . . , n, n+1) pulse) output twice to the reading line in each pixel row stands in the relation of same phase in the horizontal cycle in any case, as a result from the fact that the timing generation circuit is synchronized with the reading pulse signal φREAD generated in the horizontal blanking period. On the other hand, as apparent from FIG. 17, the selection control of each pixel row by two vertical shift registers is such that after a reset operation is conducted by using as a trigger the pulse signal φVR supplied in the field cycle with respect to the vertical shift register for reading, the pixel row is subsequently selected on the basis of the pulse signal φHP supplied in the horizontal cycle. Furthermore, the vertical shift register for the electronic shutter is reset by using different external input pulse signal φES supplied in the field cycle as a trigger prior to the reading shift register followed by subsequently conducting the selection operation of the pixel row on the basis of the pulse signal φHP supplied in the horizontal cycle thereafter.

Consequently, a gap between the drive signals (φREADi (i= . . . , n, n+1) pulse) output twice to the reading line at each pixel row is determined by multiplying a difference in the operation timing between the two vertical shift registers by using the horizontal cycle as a unit. For example, in the cases shown in FIGS. 17 and 18, the operation by the vertical shift register for the electronic shutter is advanced for one horizontal cycle, namely one pixel row portion with respect to the reading vertical shift register for the electronic shutter, and the pulse selector outputs the drive signal φREADi having the same phase between continuous horizontal periods to the reading line of each pixel row twice on the basis of the output pulse signals ROi and ESi from the two vertical shift registers. At this time, the electric charge accumulation time corresponding to the difference between the signal accumulation timing in the photodiode and the signal reading timing is 1H (horizontal cycle). In the same manner, when the operation by the vertical shift register for the electronic shutter is advanced for m pixel rows (m is an integer) with respect to the vertical shift register for reading, the electric charge accumulation time of the photodiode at each pixel row becomes m×H.

As described above, in the CMOS image sensor shown in FIG. 16, the electronic shutter can be conducted wherein the electric charge accumulation time of the photodiode can be controlled in the unit of 1H (horizontal cycle). However, with the amplification-type solid-state imaging device such as the CMOS image sensor or the like, it is assumed that the apparatus is used in the environment such as outdoors at daytime or the like in which the incident light quantity is extremely large. In order to obtain a favorable image at all times without fear that the high luminance side is not clipped under such circumstances, it is desired that a high speed electronic shutter is realized in which the electric charge accumulation time of the photodiode is decreased to 1H (horizontal cycle) or less.

BRIEF SUMMARY OF THE INVENTION

The present invention has been made in view of such circumstances. An object of the present invention is to provide a solid-state imaging device which is capable of controlling a minimum electric charge accumulation time in the photodiode to less than 1H (horizontal cycle) and conducting an extremely high-speed shutter operation.

A solid-state imaging device according to a first aspect of the present invention comprises: a pickup region formed by a plurality of unit cells arranged in two dimensions of a plurality of pixel rows and a plurality of pixel columns on a substrate, each of the unit cells being provided with a photoelectric conversion circuit configured to accumulate an electric load by photo-electrically converting incident light to a pixel, reading circuit configured to read an accumulated electric load to a detection portion, and an amplification circuit configured to amplify an electric load which has been read; a plurality of reading lines provided in a horizontal direction corresponding to a plurality of pixels lines in the pickup region, each of the reading lines transmitting a reading drive signal of a plurality of unit cells of the corresponding pixel row; a vertical driving circuit configured to selectively drive the reading circuit by supplying the reading drive signal to the plurality of reading lines; a first row selection circuit configured to output a signal for selectively specifying a pixel row in the pickup region on the basis of a first pulse; a second row selection circuit configured to output the pixel row in the pickup region on the basis of a second pulse; and a plurality of vertical signal lines provided in correspondence to a plurality of pixel columns in the pickup region to transmit a signal output from the unit cell of each pixel row in a vertical direction; wherein the vertical driving circuit drives two or more times the reading circuit of the unit cell of the pixel row selected in the pickup region on the basis of an output signal from the first row selection circuit and the second row selection circuit.

In the solid-state imaging device according to the first aspect of the present invention, the first pulse and the second pulse may be generated in mutually different phases in a horizontal blanking period.

In the solid-state imaging device according to the first aspect of the present invention, the second pulse may be formed of a phase fixed pulse generated in the horizontal blanking period and a phase variable pulse generated in the horizontal effective scanning period.

The solid-state imaging device according to the first aspect of the present invention may further comprise an A/D converter configured to convert a signal transmitted to the plurality of vertical signal lines into a digital signal; wherein a signal conversion by the A/D converter is suspended at the time of the generation of the phase variable pulse.

A solid-state imaging device according to a second aspect of the present invention comprises: a pickup region formed by a plurality of unit cells arranged in two dimensions of a plurality of pixel rows and a plurality of pixel columns on a substrate, each of the unit cells being provided with a photoelectric conversion circuit configured to accumulate an electric load by photo-electrically converting incident light to a pixel, a reading circuit configured to read an accumulated electric load to a detection portion, and an amplification circuit configured to amplify an electric load which is read; a plurality of reading lines provided in a horizontal direction corresponding to a plurality of pixels lines in the pickup region, each of the reading lines transmitting a reading drive signal of a plurality of unit cells of the corresponding pixel row; a vertical driving circuit configured to selectively drive the reading circuit by supplying the reading drive signal to the plurality of reading lines; and a plurality of vertical signal lines provided in correspondence to a plurality of pixel columns in the pickup region to transmit a signal output from the unit cell of each pixel row in a vertical direction; wherein the vertical driving circuit reads the unit cell of each pixel row in the pickup region to the reading circuit in the same horizontal blanking period, and supplies twice the drive signal.

The solid-state imaging device according to the second aspect of the present invention may further comprise a reset circuit configured to reset an electric load of a detection portion where the electric load accumulated in the photoelectric conversion circuit is read; wherein the vertical driving circuit supplies twice a reset signal for driving the reset circuit in the same horizontal blanking period prior to each of the reading drive signals.

The solid-state imaging device according to the second aspect of the present invention may further comprise a first row selection circuit and a second row selection circuit configured to control the vertical driving circuit so as to drive the reading circuit of the unit cell of the pixel cell selected in the pickup circuit on the basis of a pulse having mutually different phases in the horizontal blanking period; wherein the vertical driving circuit supplies twice the reading drive signal within the same horizontal blanking period with respect to the reading circuit of the unit cell of the selected pixel row in the pickup region corresponding to an output signal from the first row selection circuit and the second row selection circuit.

A solid-state imaging device according to a third aspect of the present invention comprises: a pickup region which has a plurality of pixel rows and which is formed by the arrangement of a unit cell in a two dimension manner on a semiconductor substrate, the unit cell having a photoelectric conversion circuit configured to accumulate an electric load by photo-electrically converting incident light to the pixel, a reading circuit configured to read an accumulated electric load to a detection portion, and an amplification circuit configured to amplify an electric load which is read; a plurality of reading lines provided in a horizontal direction corresponding to a plurality of pixels lines in the pickup region, each of the reading lines transmitting a reading drive signal of a plurality of unit cells of the corresponding pixel row; a vertical driving circuit configured to selectively drive the reading circuit by supplying the reading drive signal to the plurality of reading lines; a row selection circuit configured to select a plurality of pixel rows in the pickup region and controlling the vertical driving circuit so as to drive the reading circuit of the pixel row selected on the basis of the reading pulse signal; a plurality of vertical signal lines provided in correspondence to a plurality of pixel columns in the pickup region to transmit a signal output from the unit cell of each pixel row in a vertical direction; and a timing generation circuit configured to generate a plurality of pulse signals for conducting a series of operation with the pixel row selected with the row selection circuit on the basis of a predetermined timing signal; and wherein the timing signal has a first mode at the time of the generation of the timing per one horizontal blanking period, and a second mode in which the timing signal is supplied to the timing generation circuit twice per one horizontal blanking period.

In other words, the solid-state imaging device of the present invention is characterized in that a plurality of reading drive signal which are different in phase is supplied to the reading line of the each pixel row within the horizontal cycle so that the operation of the electronic shutter is conducted. In this manner, according to the present invention, since the signal accumulation timing and the signal reading timing in the photodiode can be set on the basis of the plurality of reading drive signal having different phases from each other within the horizontal cycle, there is no restriction such that the electric charge accumulation time of the photodiode is determined in the unit of the horizontal cycle unit with the result that the minimum electric charge accumulation time can be decreased to less than 1H (horizontal cycle).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 10A and 10B are timing waveform diagrams showing one example of an operation of the CMOS image sensor of FIG. 8.

FIG. 14 is a timing waveform diagram showing one example of an operation of the CMOS image sensor of FIG. 13.

FIG. 15 is a timing waveform diagram of a vertical shift register in the CMOS image sensor of FIG. 13.

DETAILED DESCRIPTION OF THE INVENTION

Figure 1:
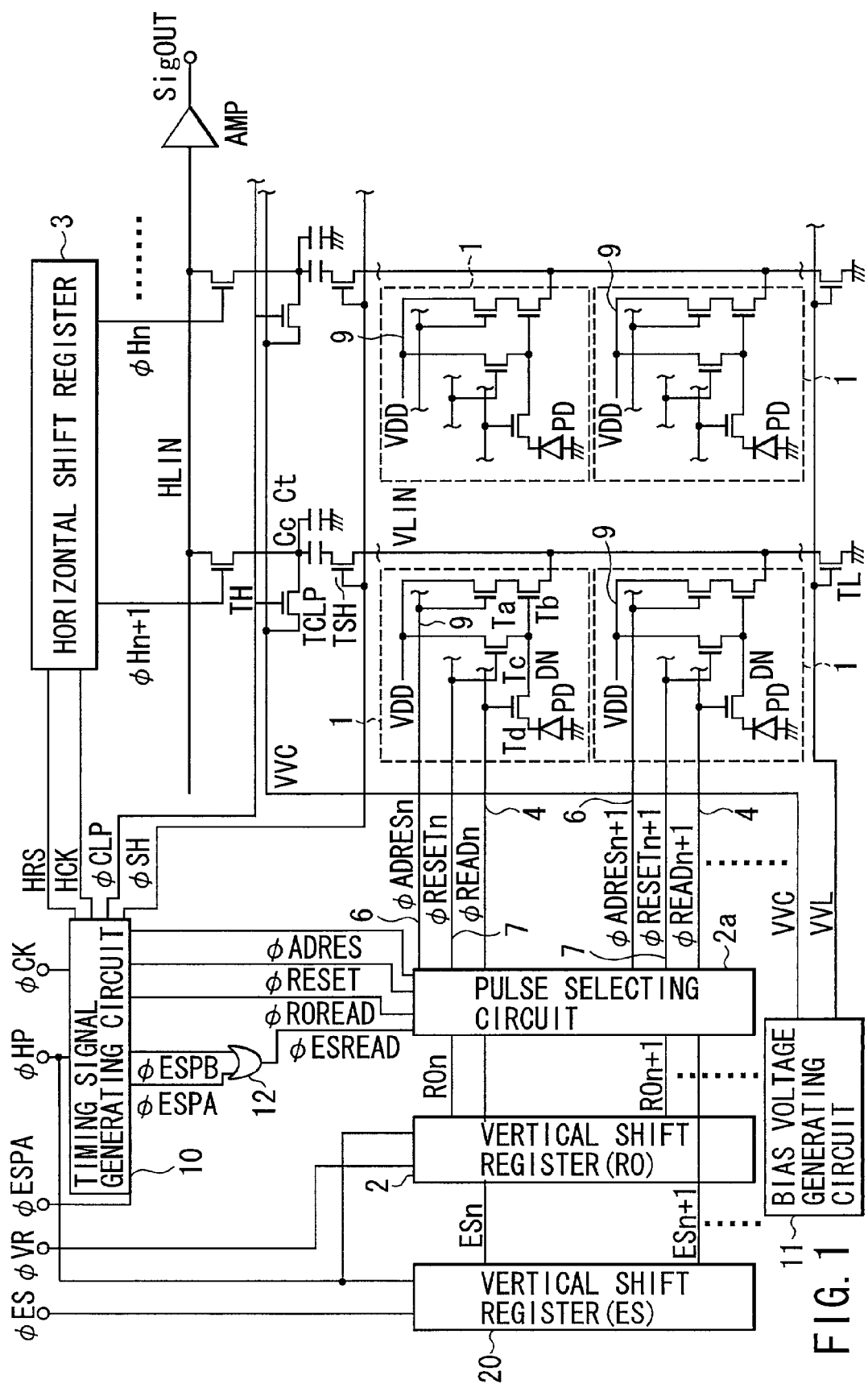
FIG. 1 is a circuit diagram showing one example of an amplification type CMOS image sensor as a solid-state imaging device according to the present invention.

Hereinbelow, embodiments of the present invention will be explained by referring to the drawings. FIG. 1 is a circuit diagram showing one example of an amplification type CMOS image sensor as a solid-state imaging device according to the present invention. This amplification type CMOS image sensor is different from the CMOS image sensor shown in FIG. 16 in that a pulse selector 2a is controlled so that the reading drive signal is supplied to specific pixel row respectively on the basis of the pulse signals φROREAD and φESREAD having mutually different phases in the horizontal cycle.

That is, in FIG. 1, the pickup region is formed by the arrangement of one pixel/one unit of unit cell 1 in a two dimension matrix manner. Furthermore, each of the unit cell 1 is formed of, for example, four transistors Ta, Tb, Tc and Td, and one photodiode PD. That is, each unit cell comprises a photodiode (photoelectric conversion circuit) PD in which ground potential is supplied to the anode side, a reading transistor (reading circuit) Td having one end side connected to the cathode side of the photodiode PD, an amplification transistor (amplification circuit) Td having a gate connected to the other end side of the transistor Td, an vertical selection transistor (a row selection transistor) Ta having one end side connected to one end side of the amplification transistor, and a reset transistor (reset circuit) Tc having one end side connected to the gate of the amplification transistor Tb.

Furthermore, on the pickup region, corresponding to the each of the pixel row, there are formed a reading line 4 commonly connected to the gate of each of the reading transistors of the unit cell 1 on the same line, a vertical selection line 6 commonly connected to the gate of each of the vertical selection transistor of the unit cell on the same line, and a reset line 7 commonly connected to the gate of each of the reset transistor Tc of the unit cell on the same line. Furthermore, on the pickup region, corresponding to each of the pixel row, there are formed a vertical signal line VLIN commonly connected to the other end side of each amplification transistor Tb of the unit cell on the same row, and a power source line 9 commonly connected to the other end side of the each reset transistor Tc of the unit cell on the same row and to the other end side of each vertical selection transistor Ta.

Outside of the one end side of the pickup region, a plurality of load transistors TL connected between each of one end side of the vertical signal line VLIN and the ground potential respectively and having a bias voltage VVL supplied to the gate are arranged in a horizontal direction. On the other hand, outside of the other end side of the pickup region, for example, a noise canceller circuit formed of two transistors TSH and TCL and two capacitors Cc and Ct is arranged in a horizontal direction for each pixel. Further-more, a horizontal selection transistor TH is connected to each of the other end side of the vertical signal VL1 respectively via the noise canceller circuit and is arranged in a horizontal direction.

Furthermore, a horizontal signal line IN is commonly connected to each of the other ends of the vertical selection transistor TH. Then, a horizontal reset transistor (not shown), and the output amplification circuit AMP are connected to this horizontal signal line VLIN. Incidentally, the noise canceller circuit as described above comprises a sample holding transistor TSH having one end side connected to the other end side of the vertical signal line VLIN respectively, a coupling capacitor Cc having one end side connected to the other end side of the sample holding transistor TSH, an electric charge accumulation capacitor Ct connected between the other end side of the coupling capacitor Cc and the ground potential, and a potential clamp transistor TCLP having one end side connected to the connection nodes of these two capacitors Cc and Ct, and having a bias voltage VVC supplied to the other end side thereof. One end side of the horizontal selection transistor TH is connected to the connection nodes of the two capacitors Cc and Ct here.

Outside of the pickup region, there are arranged a reading vertical shift register (a first row selection circuit) 2 for selecting and controlling in a scanning manner a plurality of vertical selection lines of the pickup region, a vertical shift register (a second row selection circuit) 20 for an electronic shutter, a pulse selector (a vertical driving circuit) 2a for driving in a scanning manner a vertical selection line 6 on each line of the pickup region by selecting and controlling an output pulse of the vertical shift registers 2 and 20, and a horizontal shift register 3 for driving in a scanning manner the horizontal selection transistor TH. Furthermore, outside of the pickup region, there are provided a timing generation circuit 10 for generating each kind of a pulse signal at a predetermined timing on the basis of the external input pulse signal, and supplying the pulse signal to a pulse selector 2a, a horizontal shift register 3 and a noise canceller or the like, a bias generation circuit 11 for generating a predetermined bias potential supplied to one end of the potential clamping transistor TCLP of the noise canceller circuit, and the gate or the like of the load transistor TL.

Furthermore, in the CMOS image sensor shown in FIG. 1, an OR circuit 12 is newly provided wherein a variable electronic shutter pulse signal φESPA is appropriately supplied as an external input pulse signal. To the OR circuit 12, an electronic shutter pulse signal φESPB having a fixed phase which signal is generated at the timing generation circuit 10 is input together with an electronic shutter pulse signal φESPA having a variable phase. The electronic shutter pulse signal φESREAD generated through the synthesis of the variable electronic shutter pulse signal φESPA and the fixed electronic shutter pulse signal φESPB in the OR circuit 12 is output to the pulse selector. Incidentally, in this CMOS image sensor, the variable electronic shutter pulse signal φESPA is supplied in the horizontal effective scanning period when needed while the fixed electronic shutter pulse signal φESPB is constantly generated in the horizontal blanking period.

Figure 2:
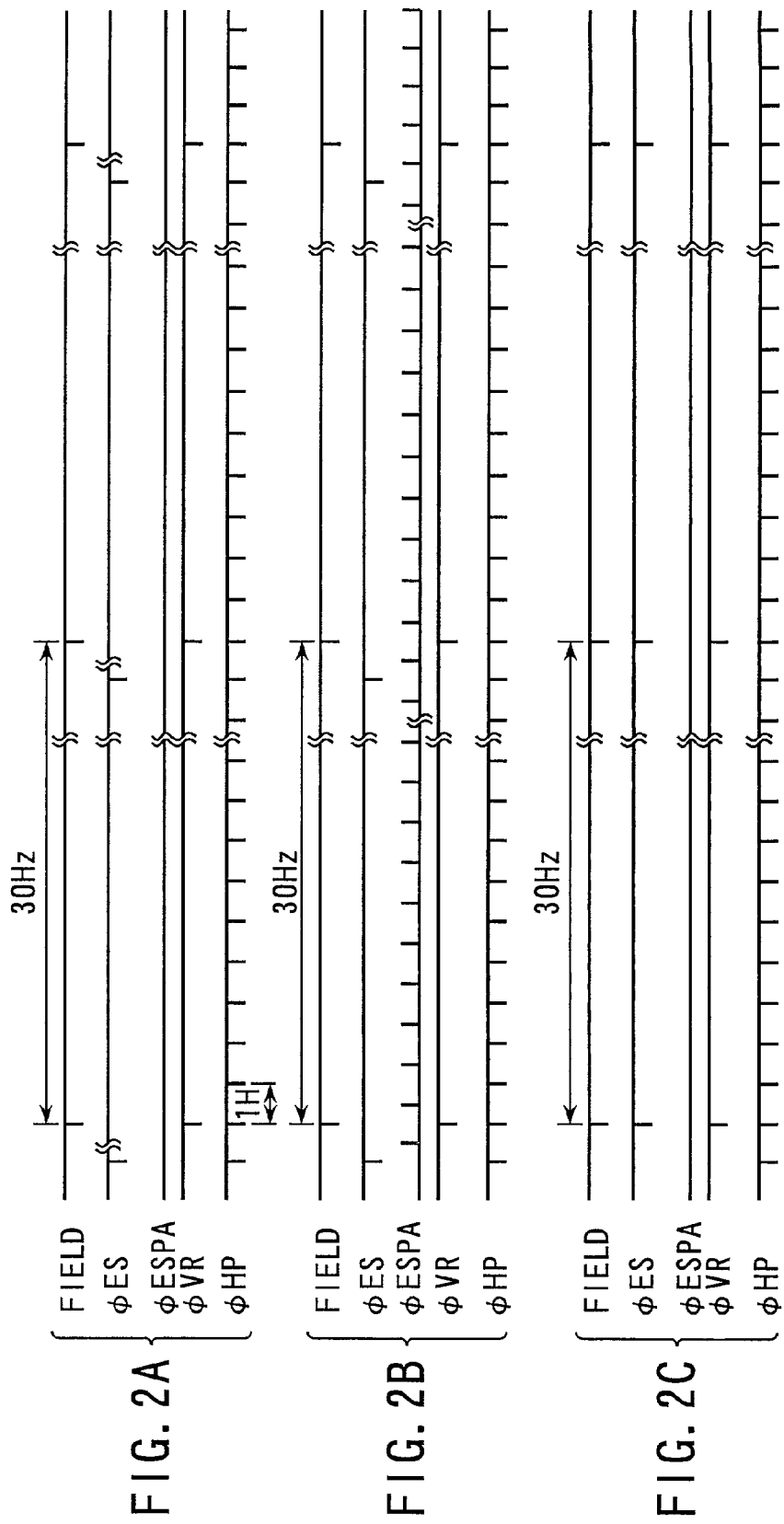
FIGS. 2A, 2B and 2C are waveform diagrams of an external input pulse signal supplied to an image sensor of FIG. 1.

FIG. 2 shows a waveform diagram of an outside pulse signal supplied to the CMOS image sensor of FIG. 1. Here, there is shown a case in which the CMOS image sensor is operated in the 30 Hz VGA method of one field=1/30 Hz.

Figure 16:
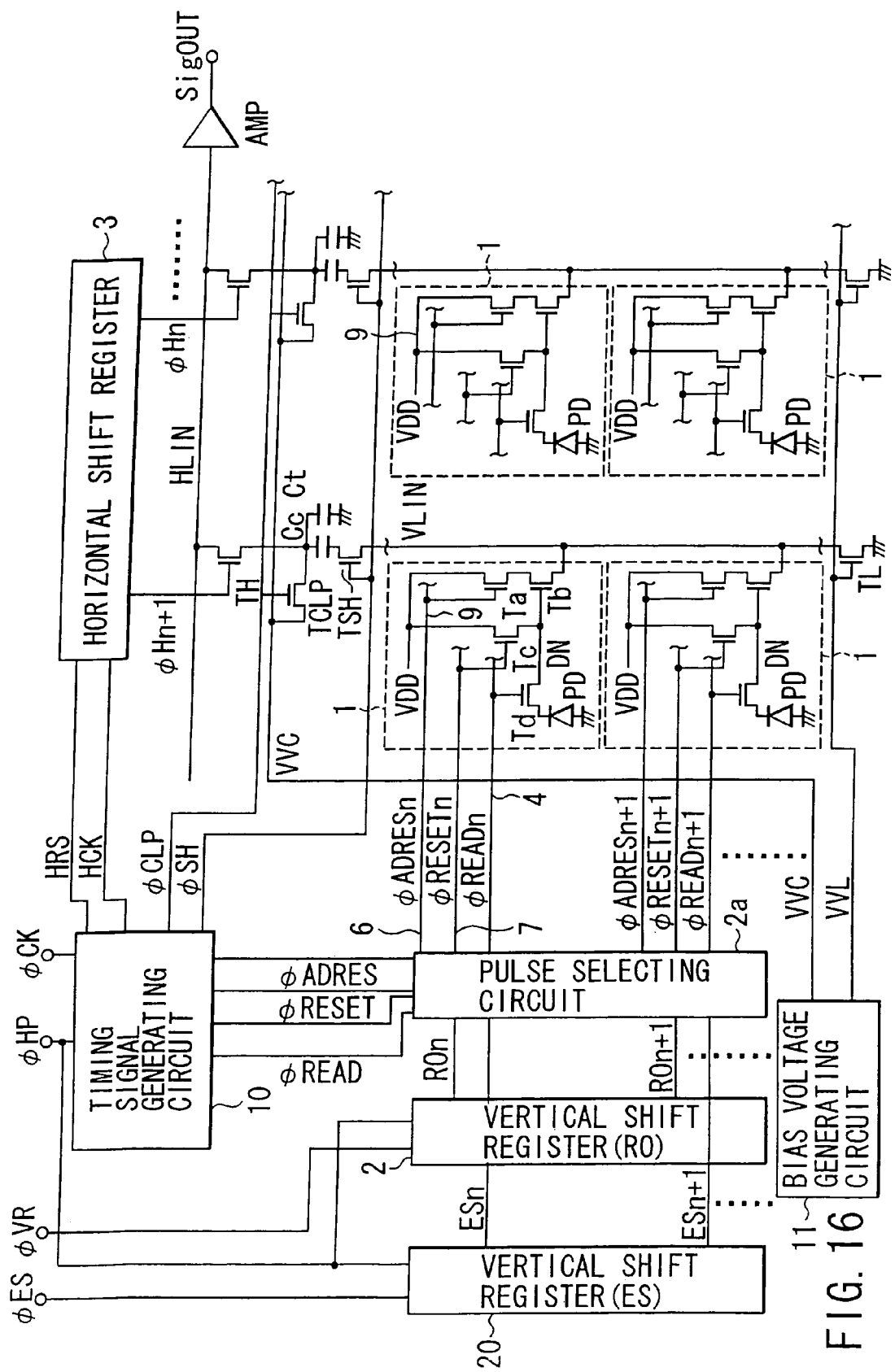
FIG. 16 is a circuit diagram showing an amplification type CMOS image sensor in which an electronic shutter is made possible.
Figure 17:
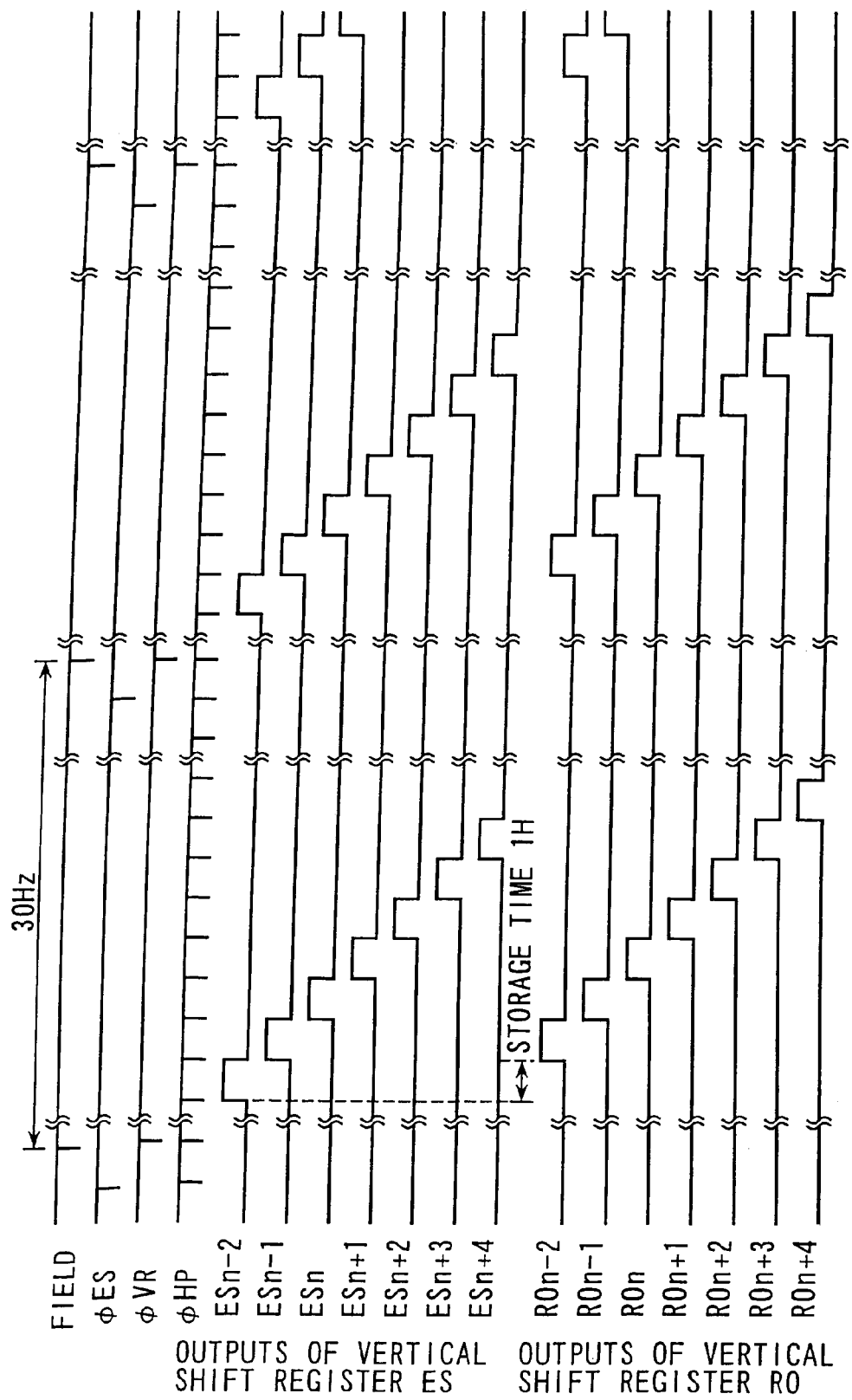
FIG. 17 is a timing waveform diagram of the vertical shift register in the CMOS image sensor of FIG. 16.

The fact that φVR of 30 Hz, φES and φHP of 15.7 Hz are supplied in the field cycle and a horizontal cycle respectively as an external input pulse signal is similar to the case of the CMOS image sensor which has been shown and explained in FIG. 16. Incidentally, with respect to the timing generation circuit, the clock signal φCK of 24 M Hz not shown in FIGS. 2A, 2B and 2C is also supplied to the CMOS image sensor of FIGS. 1 and 16.

FIGS. 2A, 2B and 2C all show the waveform diagrams of the external input pulse signal with respect to the case where the electric charge accumulation time is changed in the photodiode at the time of conducting the electronic shutter operation. Specifically, FIG. 2A is a view showing an electric charge accumulation time equal to or more than 1H (horizontal cycle), FIG. 2B is a view showing the electric charge accumulation time of not less than one horizontal blanking period (horizontal cycle) and less than 1H (horizontal cycle), and FIG. 2C is a view showing an example of the electric charge accumulation time less than one horizontal blanking period.

Here, in FIG. 2B, the electric charge accumulation time is controlled to less than 1H (a horizontal cycle) by supplying the variable electronic shutter pulse signal φESPA in the horizontal effective scanning period with the result that the electric charge accumulation time can be further variably controlled by changing the phase of the variable electronic shutter pulse signal φESPA. On the other hand, in FIGS. 2A and 2C, the signal accumulation timing is set with the fixed electronic shutter pulse signal φESPB. Thus, the variable electronic shutter pulse signal φESPA is constantly on an "L" level and is not sufficiently used.

That is, these electronic accumulation times are common in that the signal accumulation timing and the signal reading timing are determined on the basis of the fixed electronic shutter pulse signal φESPB and the reading pulse signal φROREAD. However, the electric charge accumulation time is different from each other by making different a difference in the operation timing between the two vertical shift registers. In this manner, from FIGS. 2A, 2B and 2C, it can be seen that the electric charge accumulation time of the photodiode can be controlled with the change in the supply timing of the external input pulse signal φES for determining the start period of the selection operation of the pixel row by the shift register 20 for the electronic shutter, the supply of the variable electronic shutter pulse signal φESPA and the adjustment of the timing of the signal.

Out of the external input pulse signals described above, the φVR of 30 Hz is formed with the buffer circuit not shown, and is supplied to the vertical shift register 20 for the electronic shutter. After the φES is buffer formed in the same manner, the φES is supplied to the vertical shift register 20 for the electronic shutter. Furthermore, the φHP of the 15.7 Hz is supplied to the timing generation circuit 10 and two vertical shift registers 2, and 20 respectively.

The reading vertical shift register 2 subsequently sets the output pulse signal ROi (i= ..., n, n+1) to the "H" level and inputs the signal to the pulse selector 2a by supplying these external input pulse signals. Then the vertical shift register 20 for the electronic shutter sets the output pulse signal ESi (I= ..., n, n+1) to the "H" level, and inputs the signal to the pulse selector 2a. On the other hand, the timing generation circuit 10 generates the vertical selection pulse signal φADRES, the reset pulse signal PRESET and the reading pulse signal φROREAD in the horizontal blanking period, and inputs the signals to the pulse selector 2a, supplied the drive signal φSH of the sample holding transistor TSH in the noise canceller circuit, and the drive signal φCLK of the potential clamp transistor TCLP, and outputs the horizontal reset signal HRS and the timing signal HCK to the horizontal shift register 3. Furthermore, here, the timing generation circuit 10 generates the fixed electronic shutter pulse signal φESPB having a different phase than the reading pulse signal φROREAD in the horizontal blanking period and outputs the signal to the OR circuit 12.

The pulse selector 2a activates a signal (φADRESi pulse) of the vertical selection line 6, a signal of (φRESETi pulse) of the reset line 7 and a signal of the reading line 4 so as to be synchronized with the vertical selection pulse signal φADRES, the reset pulse signal PRESET, the reading pulse signal φROREAD, or an electronic shutter pulse signal φESREAD output from the OR circuit 12. Specifically, when the output pulse signal ROi (i= ..., n, n+1) from the reading vertical shift register 2 is set to a "H" level, the signal (φADRESi pulse) of the vertical selection line 6, and the signal of (φRESETi pulse) of the reset line 7 and the signal of the reading line 4 are activated on the basis of the vertical selection pulse signal φADRES, the reset pulse signal PRESET and the reading pulse signal φROREAD with respect to the corresponding pixel row.

Figure 3:
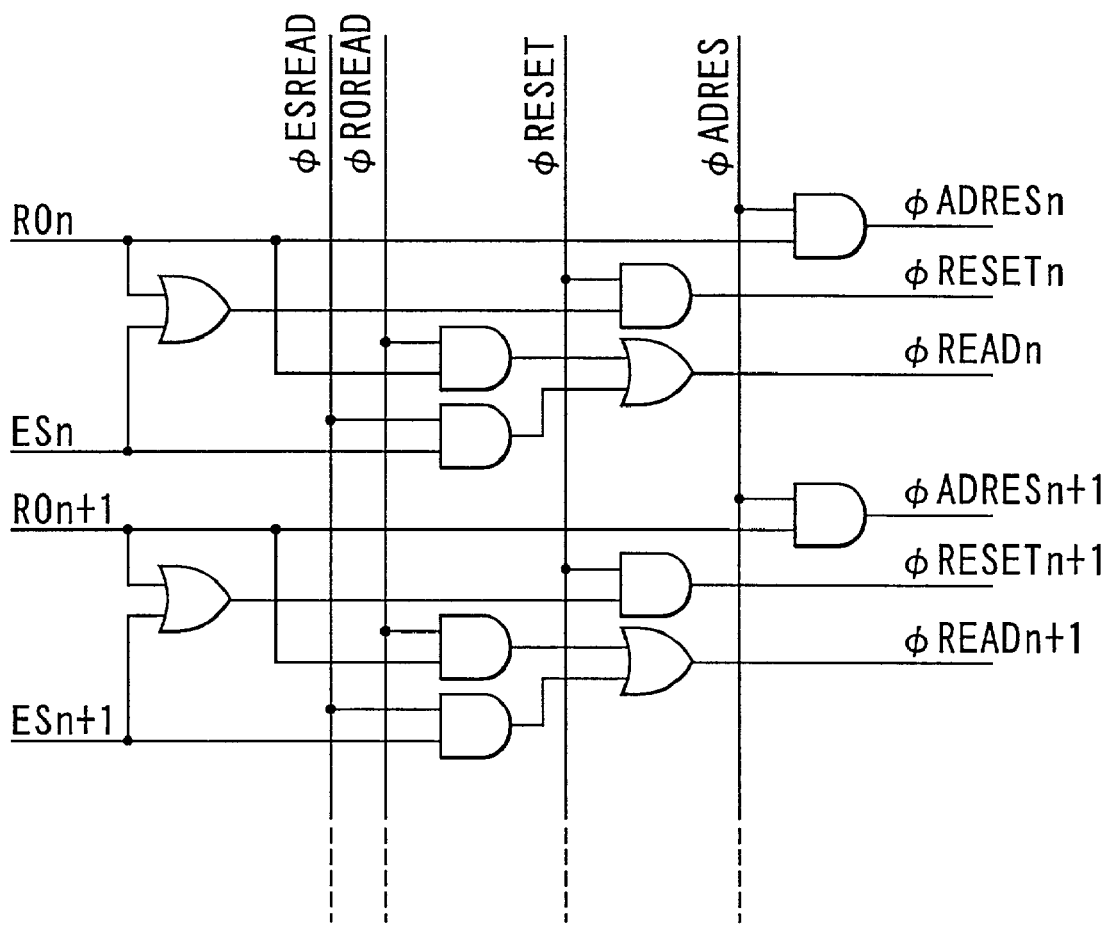
FIG. 3 is a circuit diagram showing one example of a pulse selector of FIG. 1.

Furthermore, in the case where the output pulse signal ESi (i= ..., n, n+1) is set to a "H" level, only the reset pulse signal (φRESETi pulse) and the signal (READi pulse) of the reading line 4 are activated on the basis of the signal of the reset pulse signal φRESET and the electronic shutter pulse signal φESREAD. On the other hand, even when the vertical selection pulse signal φADRES is input, the signal (φADRESi pulse) of the vertical selection signal 6 is not activated. Incidentally, FIG. 3 shows one example of a circuit structure of such pulse selector 2a.

Figure 4:
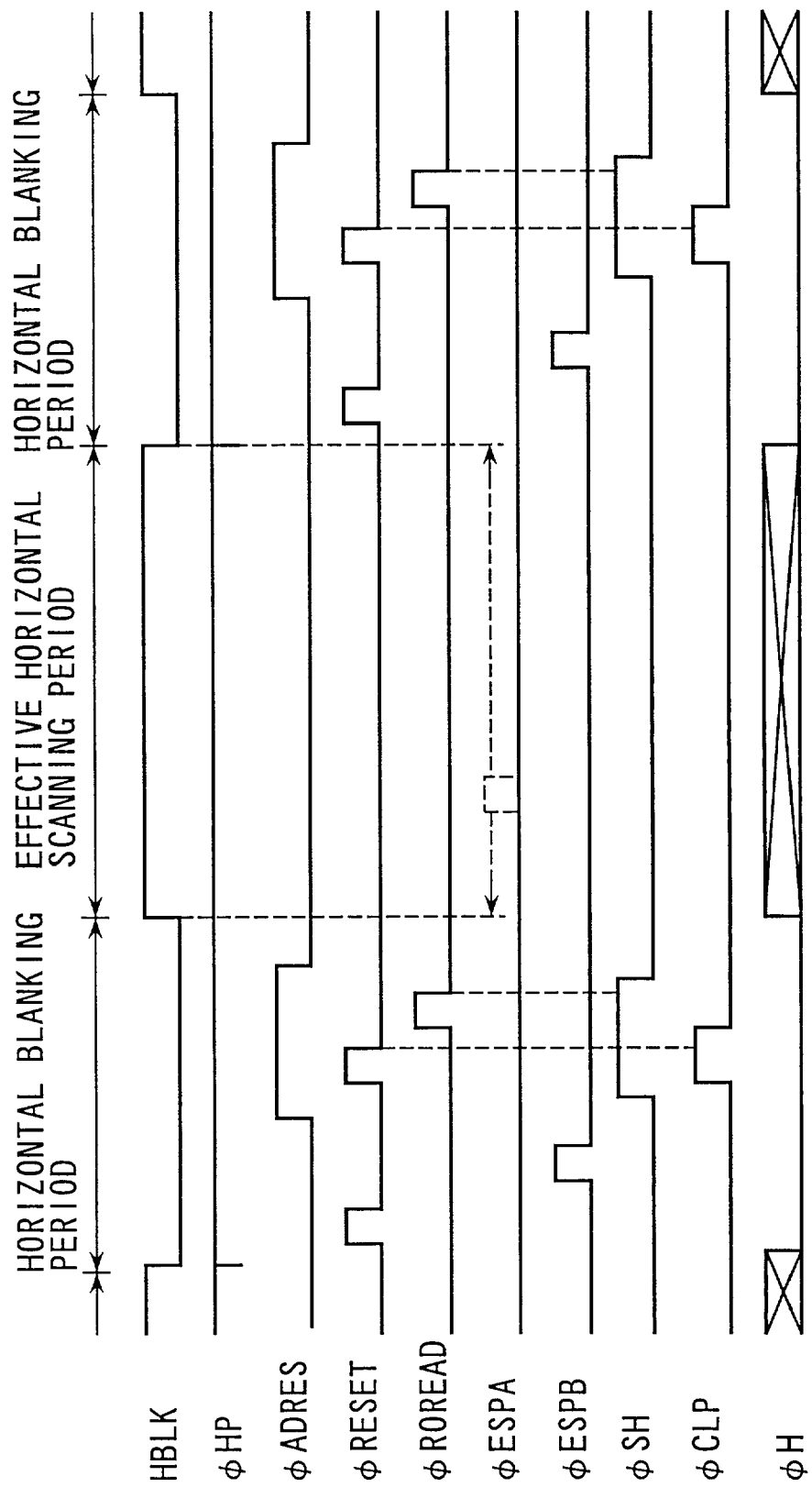
FIG. 4 is a timing waveform diagram showing one example of an operation of a CMOS image sensor of FIG. 1.

FIG. 4 is a timing waveform diagram showing one example of the operation of the CMOS image sensor of FIG. 1. A signal charge generated by the photo-electric conversion of the incident light to each of the photodiode PD is accumulated in the photodiode PD. Here, in the beginning, in the horizontal blanking period, the signal of the reset line 7 is activated with respect to the pixel row selected with two vertical shift registers 2 and 20 so as to be synchronized with the reset pulse signal φ generated in the timing generation circuit in the horizontal blanking period in the beginning here. In this manner, a gate voltage of the amplification transistor Tb is reset to the reference voltage for a definite period to output the reference voltage to the vertical signal line VLIN. Incidentally, one horizontal period is divided into a horizontal blanking period and a horizontal effective scanning period with the control signal HBLK in FIG. 4.

Subsequently, the signal of the vertical selection line 6 of the line to be selected which is selected with the reading vertical shift register 2 is activated on the basis of the vertical selection pulse signal φADRES generated by the timing generation circuit 10 in order to select the corresponding vertical selection signal 6 in preparation for the reading of the accumulation electric load in preparation for the reading of the accumulation electric load of the photodiode PD in the unit cell for the desired one portion, so that the vertical selection transistor Ta for one line portion is turned on. A sheath follower circuit comprising a load transistor TL and an amplification transistor Tb to which power source potential (for example, 3.3V) is supplied via the vertical selection transistor Ta with respect to the unit cell for one line portion which is selected in this manner.

Subsequently, the gate voltage of the amplification transistor Tb is reset to the reference voltage by activating again the signal of the reset line 7 so as to be synchronized with the reset pulse signal φRESET in the unit cell of the pixel row selected with two vertical shift registers 2 and 20, so that the reference voltage is output to the vertical signal line VIN. At this time, the drive signal (φSH pulse) of the sample holding transistor TSH in the noise canceller circuit is activated in advance in order to eliminate the unevenness of the reset potential of each vertical signal line VLIN as a result of the variation in the gate potential of the amplification transistor Tb of the unit cell for one line portion. Furthermore, after the reference voltage is output to the vertical signal line VLIN, the drive signal (φCLP pulse) for the potential clamp transistor TCLP is activated for a definite time, so that the reference voltage is set to the connection node of two capacitors Cc and Ct of the noise canceller circuit.

Subsequently, after the signal of the reset line 7 is inactivated, the signal is activated by selecting the reading line 4 of the selection object line on the basis of a reading pulse signal φROREAD which constitutes the timing generation circuit 10. Thus, the reading transistor Td is turned on so that the gate potential is changed by reading the accumulation electric load of the photodiode PD to the gate of the amplification transistor Tb which constitutes the detection portion DN. The amplification transistor Tb outputs the signal voltage to the corresponding vertical signal line VLIN and the noise canceller circuit in accordance with the change quantity of the gate potential. Incidentally, the reading pulse signal φROREAD is substantially the same with the reading pulse which has been used in the conventional CMOS image sensor as described above.

After this, the signal component which corresponds to a difference portion between the reference voltage and the output signal voltage by turning off the φSH pulse in the noise canceller circuit, in other words, the signal voltage in which noise is cancelled is accumulated in the capacitor Ct for the electric charge accumulation through the horizontal effective scanning period. On the other hand, the signal of the vertical selection line 6 is inactivated, and the vertical selection transistor Ta is controlled to the OFF state to render the unit cell non-selective with the result that the pickup region and the noise canceller is electrically separated from each other.

In the subsequent horizontal effective scanning period, the drive signal (φH pulse) of the horizontal selection transistor TH is subsequently turned on, so that the horizontal selection transistor TH is subsequently turned on thereby subsequently reading the signal voltage of the connection node of the two capacitors Cc and Ct in the noise canceller circuit, namely the signal retention node of the noise canceller circuit to the horizontal signal line HLIN and amplifying the signal voltage with the output amplification circuit AMP followed by being output. Incidentally, the noise canceling operation using the noise canceller circuit is conducted for each of the reading operation of one horizontal line.

In the operation here, unlike the operation example of the CMOS image sensor shown in FIG. 16, the signal of the predetermined reset line is activated twice in the same horizontal blanking period. In other words, the gate voltage of the amplification transistor is reset twice. This results from the fact that the CMOS image sensor of FIG. 1 supplies the reading drive signal to the reading line of specific pixel row respectively on the basis of the reading pulse signal φROREAD having different phase, and the electronic shutter pulse signal φESREAD, and the accumulation electric load is discharged from the photodiode twice to operate the electronic shutter.

That is, as shown in FIG. 4, the reset pulse signal φRESET is output to the pulse selector from the timing generation circuit in any case before the signal reading pulse signal φROREAD and the fixed electronic shutter pulse signal φESPB are supplied. In this manner, before the accumulation electric load of the photodiode at the signal accumulation timing and at the signal reading timing, the gate voltage of the amplification transistor is controlled in such a manner that the gate voltage is reset to the reference voltage.

Incidentally, in this case, as shown in FIG. 4, the phase difference between the first time reset pulse signal φRESET and the fixed electronic shutter pulse signal φESPB and the phase difference between the second time reset pulse signal φRESET and the signal reading pulse signal φROREAD are set to approximately the same level. Furthermore, in the case where the external input pulse signal is input at the timing shown in FIG. 2C is supplied as well, the electronic shutter pulse signal φESREAD is supplied with the vertical selection pulse signal φADRES to the outside of the period in which the signal of the vertical selection line 6 of the line to be selected is activated lest the accumulation electric load discharged from the photodiode be read to the vertical signal VLIN. Specifically, the variable electronic shutter pulse signal φESPA is supplied to the horizontal effective scanning period, so that the fixed shutter pulse signal φESPB supplied from the timing generation circuit in the horizontal blanking period is controlled so as to fall prior to the start-up of the vertical selection pulse signal φADRES.

Figure 5:
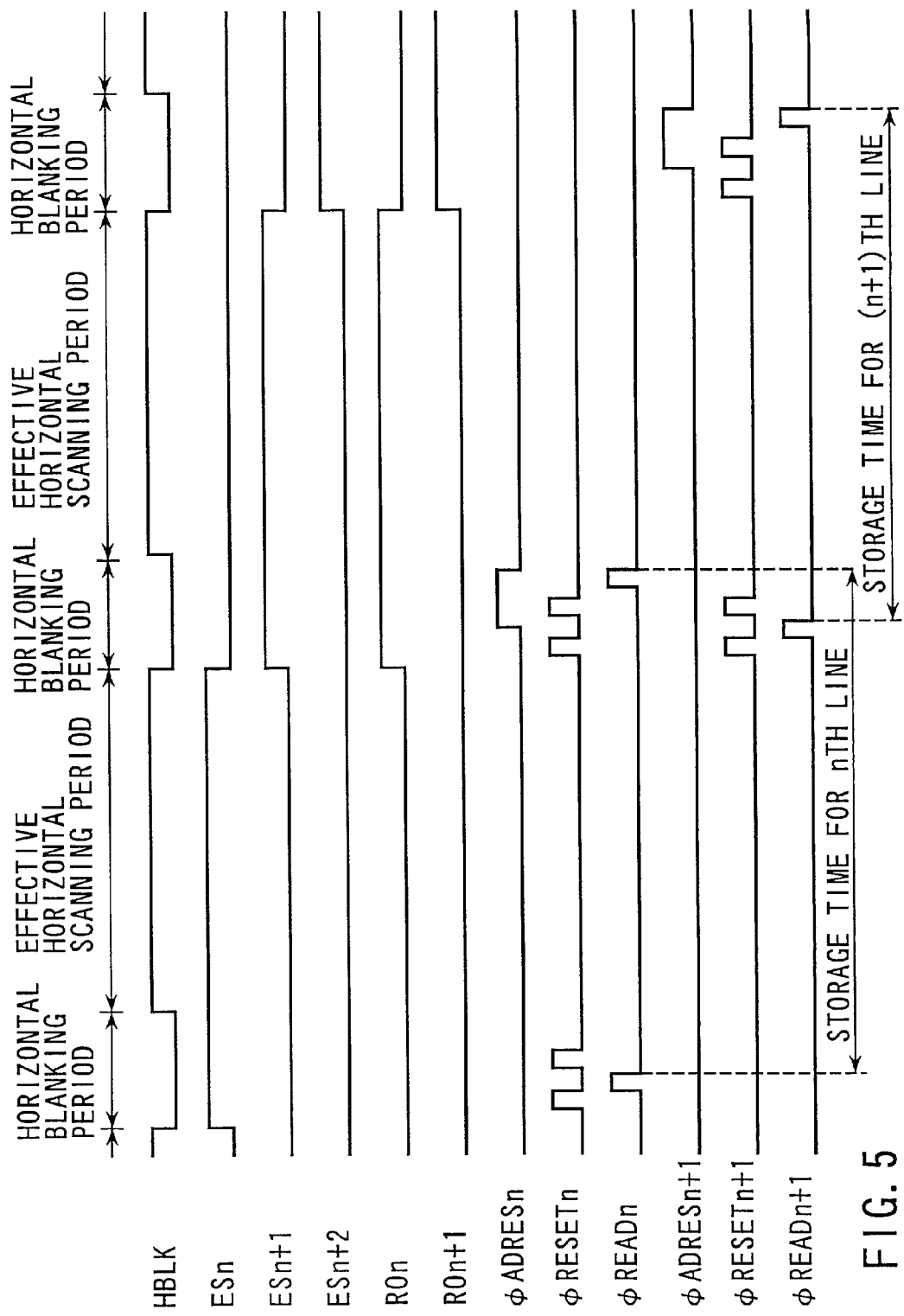
FIG. 5 is a timing waveform diagram of a pulse selector in the CMOS image sensor of FIG. 1.
Figure 6:
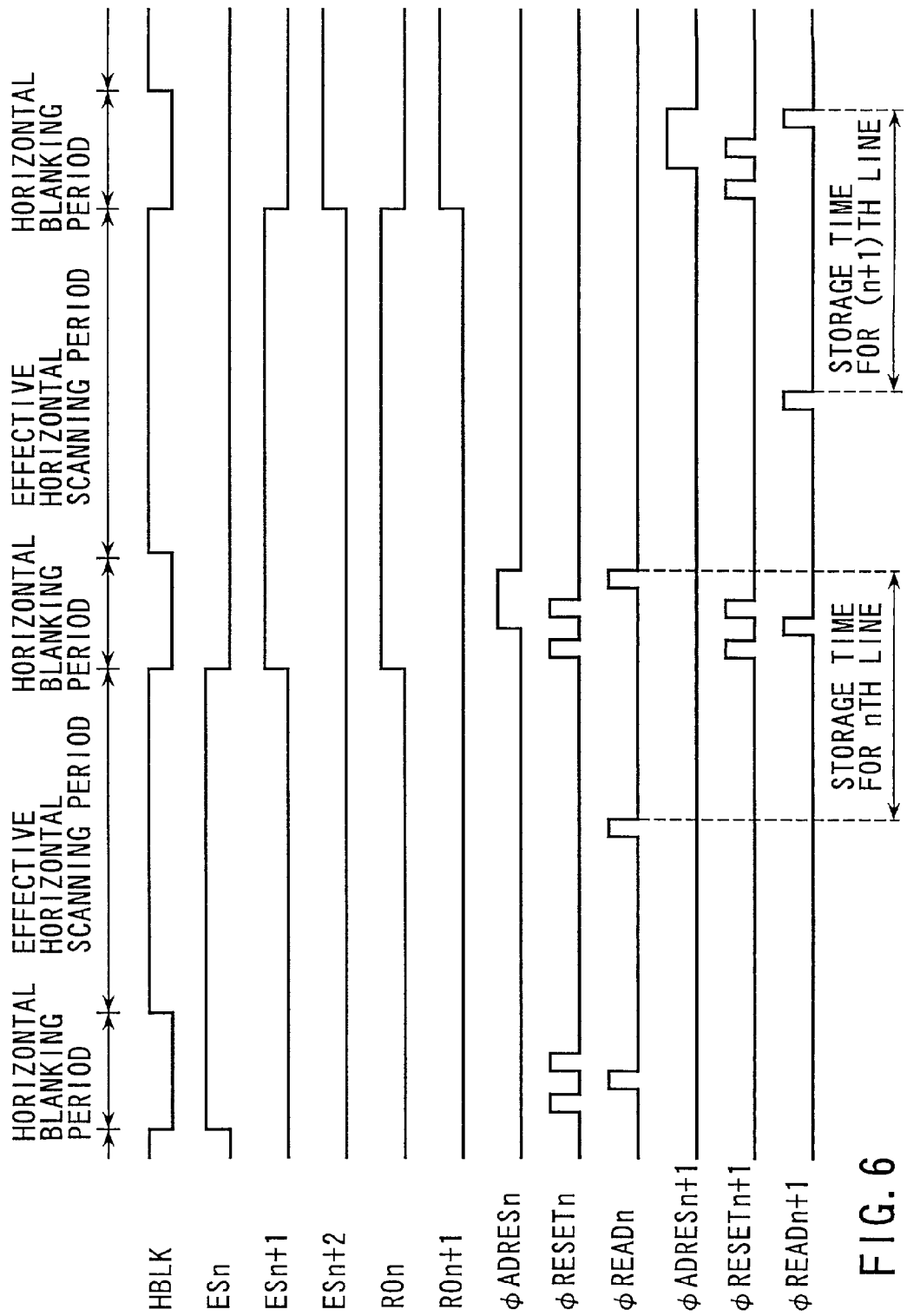
FIG. 6 is a timing waveform diagram of a pulse selector in the CMOS image sensor of FIG. 1.
Figure 7:
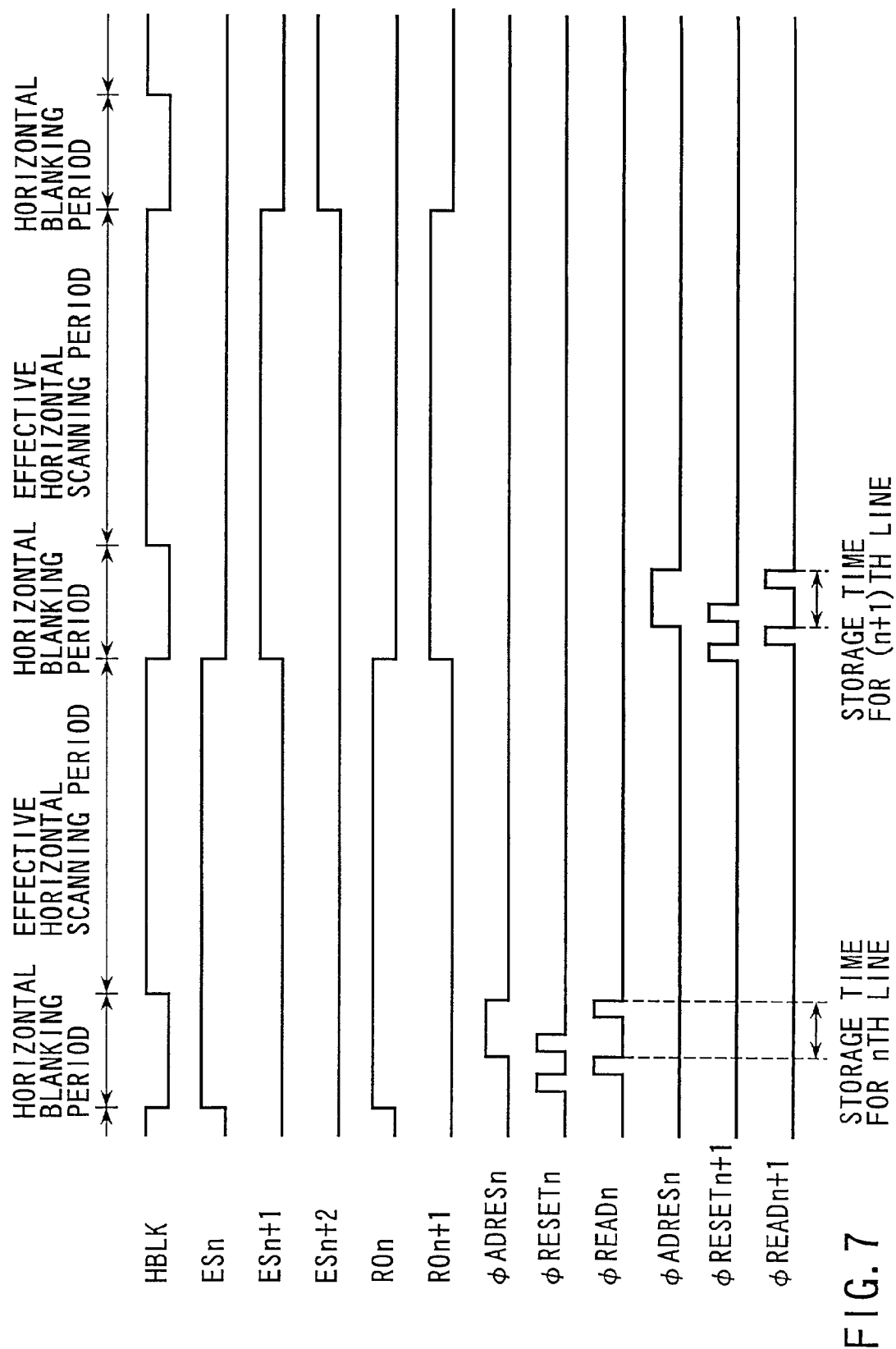
FIG. 7 is a timing waveform diagram of a pulse selector in the CMOS image sensor of FIG. 1.

Here, FIGS. 5 through 7 are timing waveform diagrams showing a pulse selector of the CMOS image sensor of FIG. 1. An operation of the CMOS image sensor will be explained.

FIGS. 5 through 7 correspond to the respective cases in which an external input pulse signal as shown in FIGS. 2A through 2C is supplied to the CMPS image sensor. FIG. 5 shows a case of electric charge accumulation time equal to or more than 1H (horizontal cycle) or more, FIG. 6 shows a case of the electric charge accumulation time of not less than one horizontal blanking period of 1H, and FIG. 7 shows a waveform diagram of a signal supplied to the pickup region when the electronic shutter is operated less than one horizontal blanking period of the electric charge accumulation time.

Figure 18:
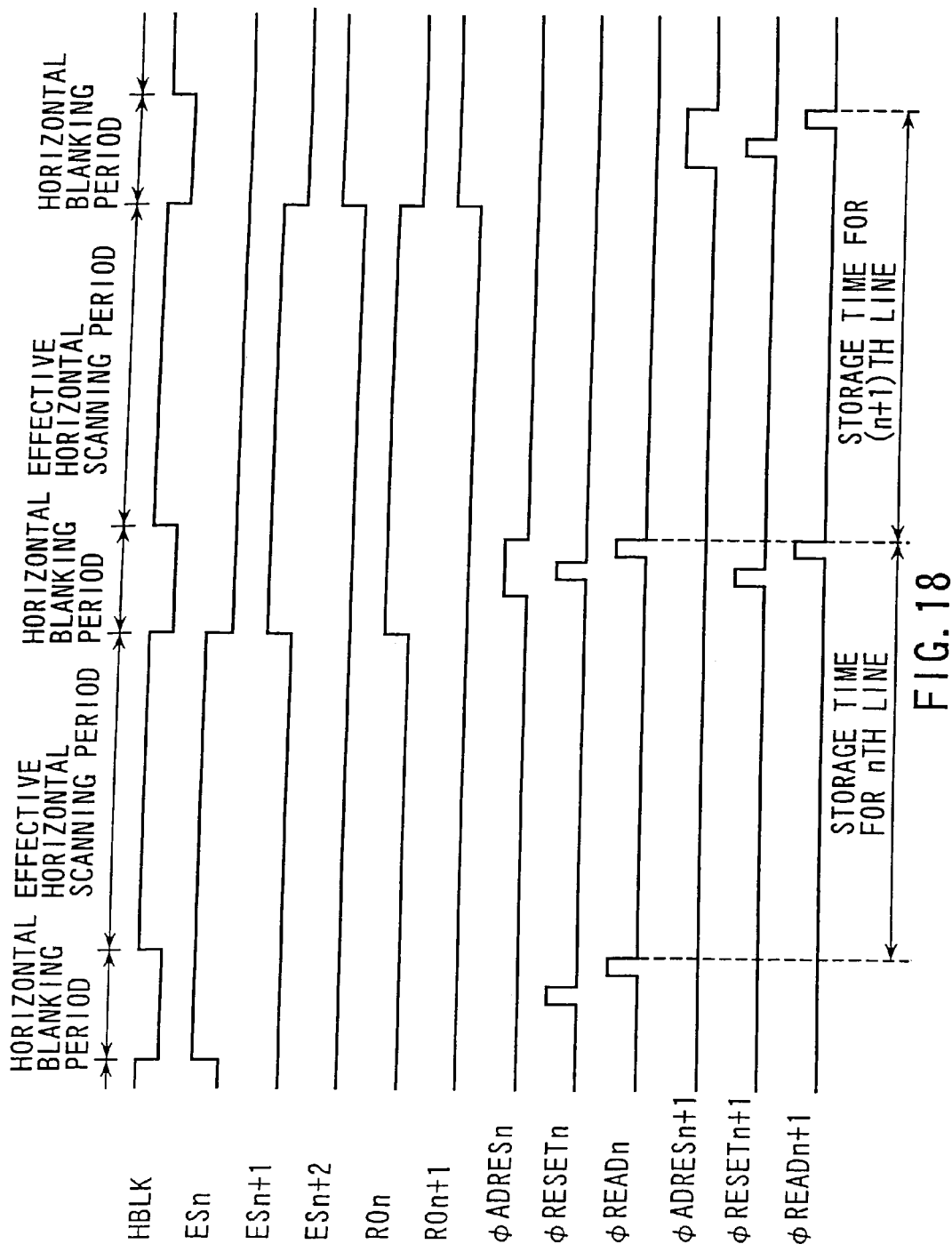
FIG. 18 is a timing waveform diagram of a pulse selector in the CMOS image sensor of FIG. 16.

In FIG. 5, the operation by the vertical shift register for the electronic shutter is advanced by one horizontal cycle, namely one pixel portion with respect to the reading vertical shift register. FIG. 5 corresponds to the waveform diagram shown in FIG. 18. The pulse selector outputs the reading drive signal.

φREADi twice to the reading line of each pixel row in the continuous horizontal period on the basis of each output pulse signal ROi and ESi from two vertical shift registers. At this time, the phase of the reading drive signal φREADi differs in the continuous front and rear horizontal period and the electric charge accumulation time in the photodiode becomes somewhat longer than 1H (horizontal period).

Furthermore, as shown in FIG. 6, the reading drive signal φREADi is output three times to the reading line of each of the pixel rows. In the case shown in FIG. 5, the reading drive signal φREADi is added once and is output to the reading line by supplying the variable electronic shutter pulse signal φESPA which is not substantially used. Specifically, as shown in FIG. 5, the third pulse of the reading drive signal φREADi is output in the horizontal effective scanning period between the two pulses of the reading drive signal φREADi output to the horizontal blanking period.

The electric charge accumulation time of the photodiode here extends from the reading drive signal φREADi output in the horizontal effective scanning period on the basis of the variable electronic shutter pulse signal φESPA up to the signal reading timing in the horizontal blanking period subsequent to this horizontal effective scanning period, so that 1H (horizontal cycle) can be more shortened. Besides, the supply timing of the variable electronic shutter pulse signal φESPA is rendered variable in a period immediately after the start of the horizontal effective scanning period up to immediately before the end of the horizontal effective scanning time, so that the electric charge accumulation time can be freely set approximately within the scope of not less than the horizontal blanking period and less than 1H (horizontal cycle).

Incidentally, as described above, in the case where the reading drive signal φREADi is output to the horizontal effective period to conduct the electronic shutter operation, the period is long for conducting an operation of resetting the gate voltage of the amplification transistor to the reference voltage on the basis of the reset pulse signal φRESET output to the horizontal blanking period at the time of discharging the accumulation electric load of the photodiode, so that the change in the potential resulting from the leak current is likely to be generated after the reset. However, in the beginning, the first time signal φRESETi of the reset line activated twice in the same horizontal blanking period with respect to each of the pixel row and the first pulse of the reading drive signal φREAD output three times in total up to the signal reading timing are continuously supplied, so that the electric load accumulated in the photodiode before that is temporarily discharged at this point of time. Consequently, when the electric load is discharged from the photodiode at the signal accumulation timing set in the horizontal effective scanning period, the accumulation electric load quantity is few in the photodiode, and the accumulation electric load of the photodiode is sufficiently discharged with no remained quantity even if some degree of potential change is generated after the reset of the gate voltage of the amplification transistor.

Furthermore, in FIG. 7, the operation of the vertical shift register for the electronic shutter is not allowed to be advanced with respect to the operation of the reading vertical shift register, so that the vertical shift register for the electronic shutter and the vertical shift register for reading are controlled so as to select and operate the same pixel row in each horizontal period. Besides, the variable electronic shutter is not substantially used. As a consequence, the pulse selector outputs twice the reading drive signal φREADi in the horizontal blanking period with respect to the reading line of the selected pixel row on the basis of the pulse signals φROREAD and φESREAD, and each of the output pulse signal ROi and ESi from two vertical shift registers. Consequently, the electric load value K time in the photodiode is shortened by 1H (horizontal cycle) portion as compared with the case shown in FIG. 5 with the result that the operation of the shutter is made possible wherein the electric charge accumulation time of the photodiode is set to less than one horizontal blanking period.

That is, in the CMOS image sensor as described above, the minimum electric charge accumulation time in the photodiode can be set to less than 1H (a horizontal cycle) and can be rendered variable. Specifically, in the case of the VGA method of 30 Hz, the operation of the electronic shutter of 1/525 of one field corresponding to the electric charge accumulation time of 1H up to the operation of a high-speed shutter of 1/5000 through 1/20000 can be conducted.

Figure 8:
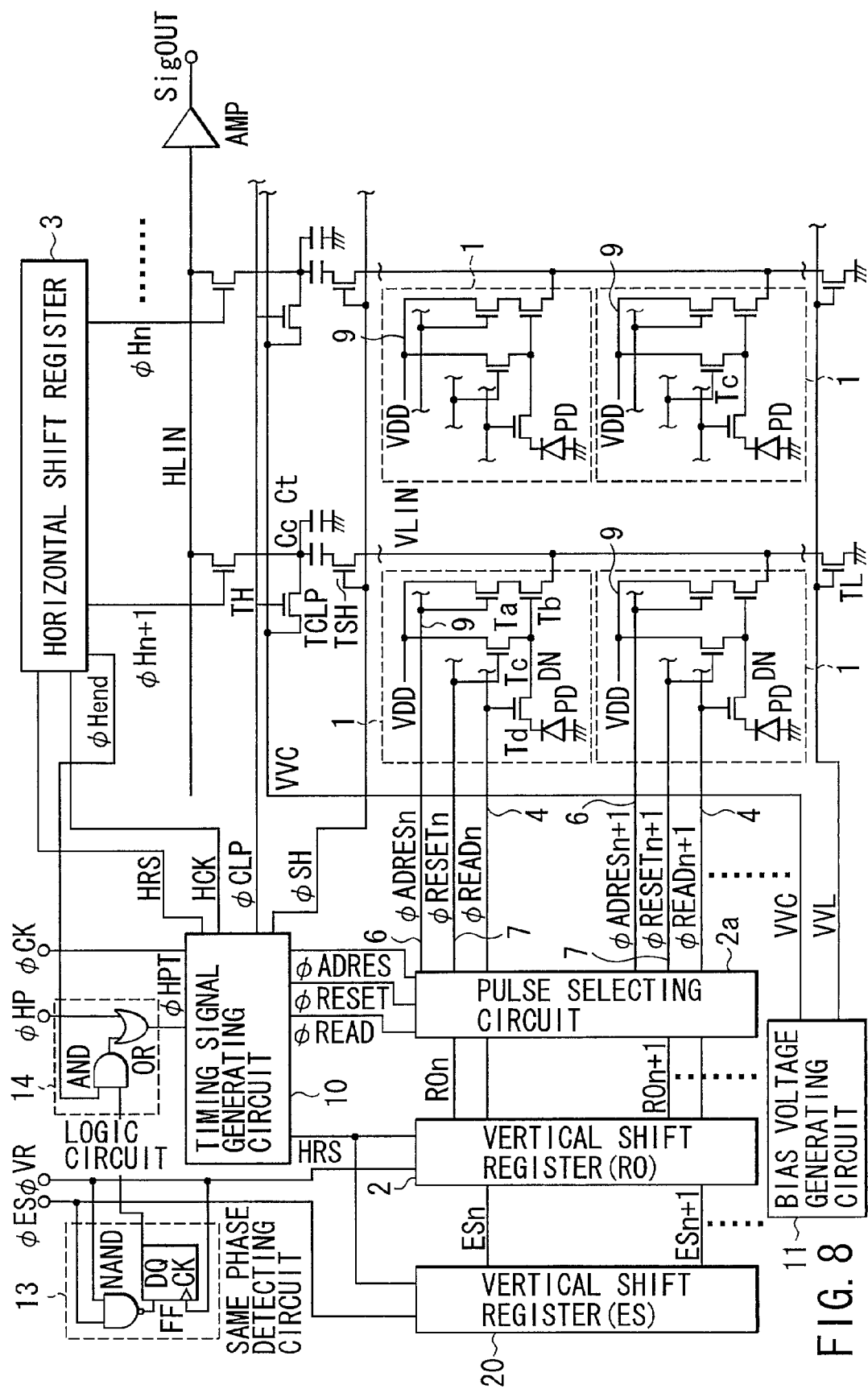
FIG. 8 is a circuit diagram showing another example of the amplification type CMOS transistor as the state image sensor device according to the present invention.
Figure 9:
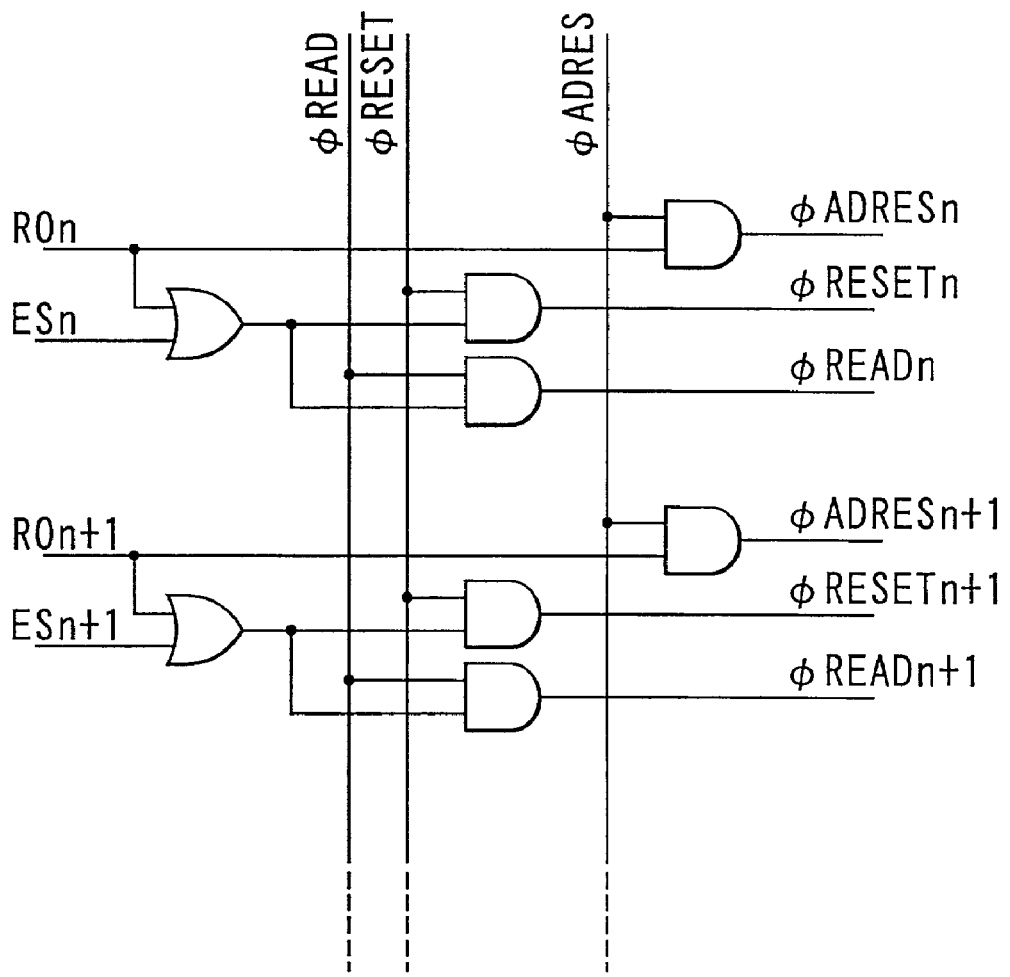
FIG. 9 is a circuit diagram showing one example of the pulse selector in FIG. 8.

Next, FIG. 8 shows a circuit diagram of another example of as the solid-state imaging device according to the present invention. Furthermore, FIG. 9 shows one example of a circuit constitution of the pulse selector 2a. The amplification type CMOS image sensor does not generate two different kinds of pulse signals φROREAD and φESREAD having mutually different phases within one horizontal cycle at all times, but operates the timing generation circuit 10 twice in the horizontal blanking period to set twice the reading pulse signal φREAD to the "H" level only in the case in which it is desired that the electric charge accumulation time is set to less than 1H (horizontal cycle).

Specifically, from the amplification type CMOS image sensor shown in FIG. 1, the OR circuit for generating the electronic shutter pulse signal φESREAD on the basis of the variable electronic shutter pulse signal φESPA and the fixed electronic shutter pulse signal φESPB is omitted. On the other hand, in the place of the OR circuit, there are provided a same phase detection circuit 13 in which the external input pulse signals φVR and φES for determining the start period of the selection operation of the pixel row by the vertical shift register 2 for reading and by the vertical shift register 20 for the electronic shutter are input for detecting that these phases have agreed with each other, and a logic circuit 14 is provided for generating the timing signal φHPT and outputting the signal to the timing generation circuit 10 on the basis of the output of the same phase detection circuit 13, the pulse signal φHend output lastly from the horizontal shift register 3 out of the drive signal (φH pulse) of the horizontal selection transistor TH, and the external input pulse signal φHP supplied in the horizontal cycle. Furthermore, as shown in FIG. 9, the circuit constitution of the pulse selector 2a is changed from the constitution shown in FIG. 3.

The same phase detection circuit 13 comprises a NAND circuit NAND to which two external input pulse signals φVR and φES and a flip-flop circuit FF in which the output of the NAND circuit NAND is supplied to the D input terminal and the external input pulse signal φVR is supplied to the CK clock input terminal. Furthermore, the logic circuit 14 is constituted of an AND circuit AND to which an output from the Q output terminal of the flip-flop circuit FF and a pulse signal φHend output lastly from the horizontal shift register 3 are input, and an OR circuit OR to which the output of the AND circuit AND and the external input pulse signal φHP is input are input.

That is, in the same phase detection circuit 13 here, when the external input pulse signal φVR and φES on the "L" level are input at the same time, the output of the NAND circuit on the "H" level is input to the D input terminal of the flip-flop circuit. The flip-flop circuit FF holds the held "H" level in the period in which the external input pulse signal φVR supplied to the CK clock input terminal is set to the "H" level thereafter, and the flip-flop circuit FF outputs the "H" level signal which is the phase agreement detection output of the external input pulse signals φVR and φES.

Consequently, in this case, the logical circuit 14 generates the timing signal φHPT respectively at the input timing of the external input pulse signal φHP and at the output timing of the pulse signal φHend of the horizontal shift register 3 to be supplied to the timing generation circuit 10. On the other hand, in one field period in which the signal on the "L" level which is a phase disagreement detection output of the external input pulse signals φVR and φES is output from the same phase detection circuit φHP, the logic circuit 14 generates the timing signal φHPT only when the external input pulse signal φHP is input. Incidentally, in the CMOS image sensor shown in FIG. 8, the shift operation at the time of selecting subsequently the pixel row with the vertical shift register 2 for reading and the vertical shift register 20 for the electronic shutter is not controlled with the pulse signal φHP. However, after the operation in the horizontal blanking period in each horizontal period is terminated, the operation is conducted to be synchronized with the horizontal reset signal HRS generated by, for example, the timing generation circuit 10.

Figure 10B:
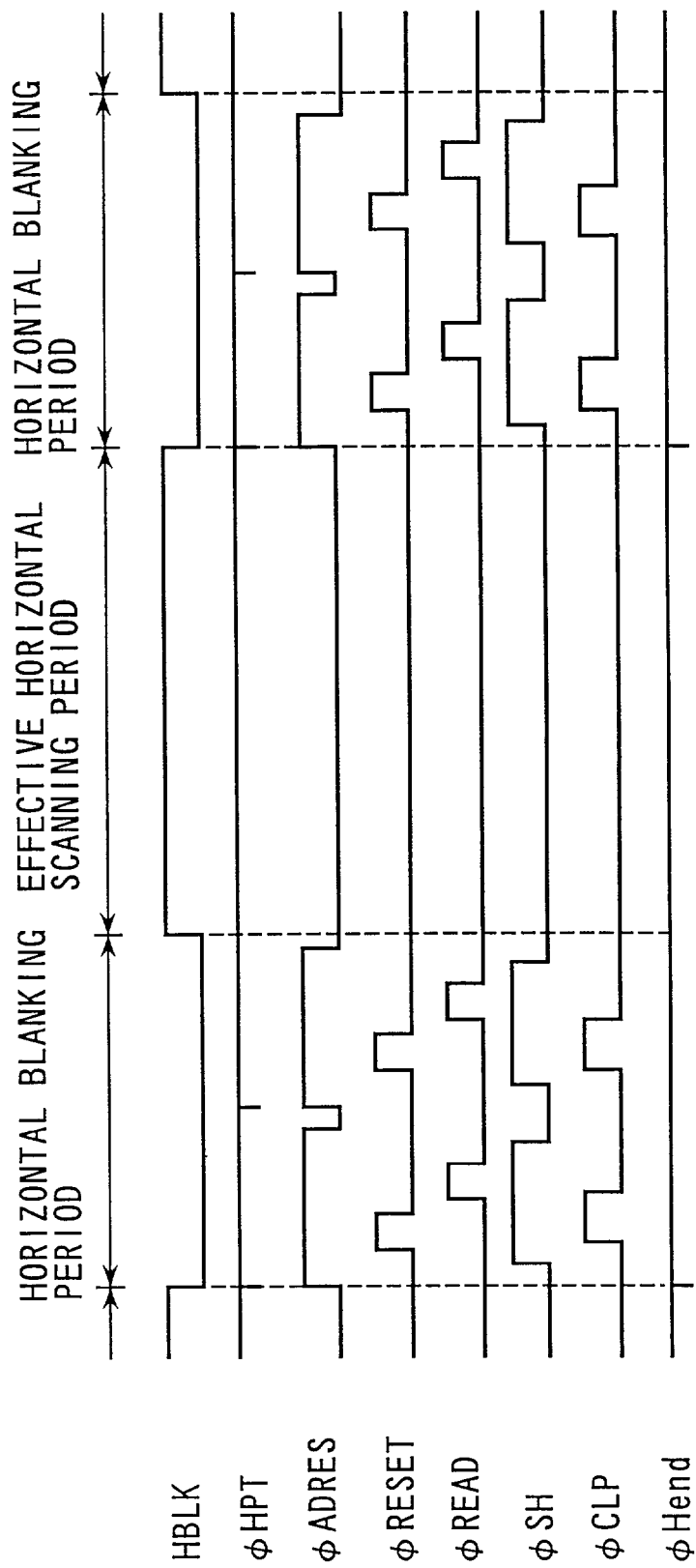

Furthermore, FIGS. 10A and 10B are timing waveform diagram showing one example of an operation of the CMOS image sensor. As shown, in FIG. 10A wherein the electric charge accumulation time of the photodiode is set to 1H (horizontal cycle) or more, the timing signal φHPT is generated once in each horizontal blanking period so as to correspond to the external input pulse signal φHP. Consequently, on the reading line of each pixel row, the drive signal which is synchronized with the reading pulse signal φREAD is output twice in the relation of the mutually the same phase in the horizontal cycle corresponding to the output pulse signals ROi and ESi from the vertical shift register for reading and the vertical shift register for the electronic shutter.

At this time, the electric charge accumulation time of the photodiode at each pixel row becomes m×H when the operation by the vertical shift register for the electronic shutter is advanced by m pixel rows (m is an integer) with respect to the vertical shift register for reading. However, here, the external input pulse signal φHP is input to the midst of each of the horizontal blanking period, and the timing generation circuit outputs the vertical selection pulse signal φANRES, a reset pulse signal φREAD, a reading pulse signal φREAD, and a drive signal φDH and φCLP with respect to the noise canceller circuit are output to the latter half of each horizontal blanking period after the input of the external input pulse signal φHP.

On the other hand, in the case shown in FIG. 10B, on the basis of the timing signal φHPT, generated in the start period of each horizontal blanking period in synchronization with the pulse signal φHend of the horizontal shift register, the vertical selection pulse signal φADREAD, the reset pulse signal φRESET, the reading pulse signal φREAD, and the drive signals φSH and φCLP with respect to the noise canceller circuit are output in the former half of each of the horizontal blanking period. Furthermore, since the phase of the external input pulse signals φVR and φES agree with each other, the vertical shift register for reading and the vertical shift register for the electronic shutter controls in each horizontal period so that the same pixel row is selected and controlled.

In this manner, here, each kind of signal described above is output from the repeating timing generation circuit in the former half and the latter half of the horizontal blanking period as shown in FIG. 10B with respect to each pixel row simultaneously selected at the vertical shifter register for reading and at the vertical shift register for the electronic shutter. Consequently, the accumulated electric load from the photodiode is discharged to the former half of the horizontal blanking period at this time, so that the signal reading operation is conducted in the latter half of the same horizontal blanking period. Thus, the electric charge accumulation time of the photodiode can be set to approximately the half of the horizontal blanking period. Besides, in the CMOS image sensor shown in FIG. 8, the external input pulse signal and the output signal from the horizontal shift register are effectively used at the timing generation circuit to generate each kind of signal, so that an extremely high speed electronic shutter can be realized at a low cost without inviting a remarkable increase in the circuit size in, for example, the pulse selector or the like.

Figure 11:
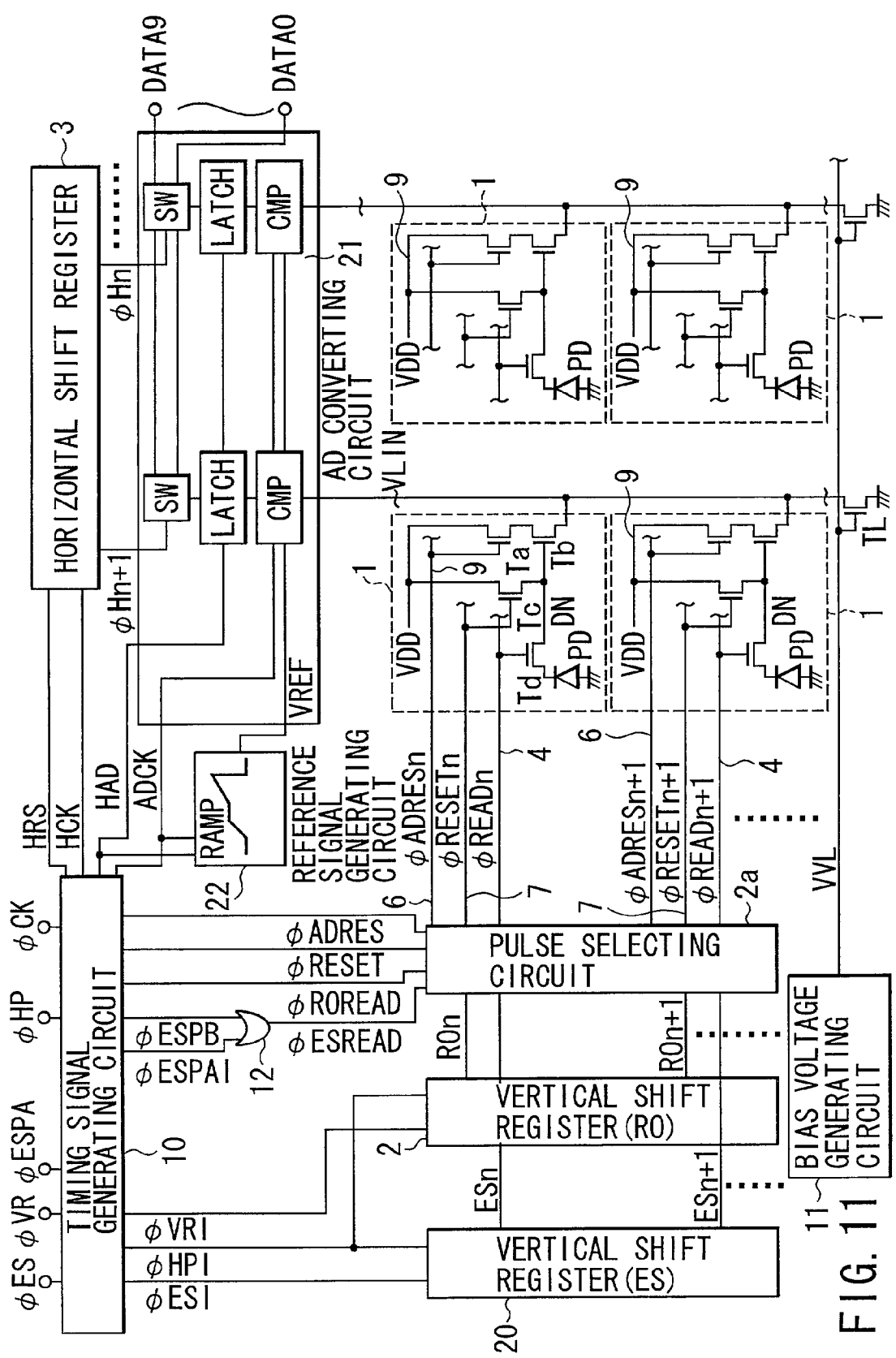
FIG. 11 is a circuit diagram showing another example of the amplification type CMOS image sensor as the state image sensor device according to the present invention.

Furthermore, as the solid-state imaging device according to the present invention, FIG. 11 shows a circuit diagram of another embodiment of an amplification type CMOS image sensor. This example is such that the A/D conversion circuit 21 provided with a noise canceling function is incorporated in the amplification type CMOS image sensor, so that an analog signal transmitted to a plurality of vertical signal line VLIN is converted into a digital signal at the A/D conversion circuit 21 and is output to the outside. Hereinbelow, the solid-state imaging device will be explained centering on a point different from the CMOS image sensor shown in FIG. 1.

That is, in the CMOS image sensor shown in FIG. 11, the end portion of the vertical signal line VLIN is connected to a comparator CMP arranged in a horizontal direction inside of the A/D conversion circuit 21 for each of the pixel column. The comparator CMP conducts the voltage comparison operation between an analog signal from the vertical signal line VLIN and the reference signal VREF output by the reference signal generation circuit 22. This reference signal VREF is a lump wave in which the voltage basically rises with the lapse of time. The comparator CMP counts the timing at which the signal voltage in which noise is cancelled and the reference voltage VREF are balanced, and the analog signal is converted into 10 bit digital signal by latching the count value. Incidentally, the comparator CMP has a sample holding capacitor not shown in order to obtain a difference between the reference voltage and the signal voltage with the noise canceller circuit in FIG. 1. Here, the signal voltage in which the noise is cancelled is generated.

Inside of the A/D conversion circuit 21, a latch circuit LATCH and a switch circuit SW are arranged in a horizontal direction so as to correspond to the comparator CMP for each of the pixel column respectively. The latch circuit LATCH holds 10 bit digital signal output from the comparator CMP, and the switch circuit SW subsequently turns on the drive signal (φH pulse) supplied from the horizontal shift register 3 with the result that the digital signal held by each of the latch circuit LATCH is subsequently read to the output signal lines DATA0 through DATA9 for the bit number portion.

To the A/D conversion circuit 21 and the reference signal generation circuit 22 described above, a count signal ADCK and a horizontal synchronization signal HAD are output from the timing signal generation circuit 10, so that the operation of the circuit is controlled. Furthermore, after the external input pulse signals φVR, φES and φHP supplied in a field cycle or in a horizontal cycle are input, inside input pulse signals φVRI, φESI and φHPI are generated and output to two vertical shift registers 2 and 20. However, here, in the same manner as the CMOS image sensor shown in FIG. 1, the external input pulse signals φVR, φES and φHP are directly input to two vertical shift registers 2 and 20 without generating the inside pulse signals φVRI, φESI and φHPI at the timing generation circuit 10, so that the operation may be controlled. Furthermore, a command decoder circuit to which a command signal is input from the outside when needed is connected to the timing generation circuit 10, so that the gain and the offset or the like of the timing generation circuit 10 and the A/D conversion circuit 21 may be adjusted with the output signal of the command decoder circuit.

Figure 12:
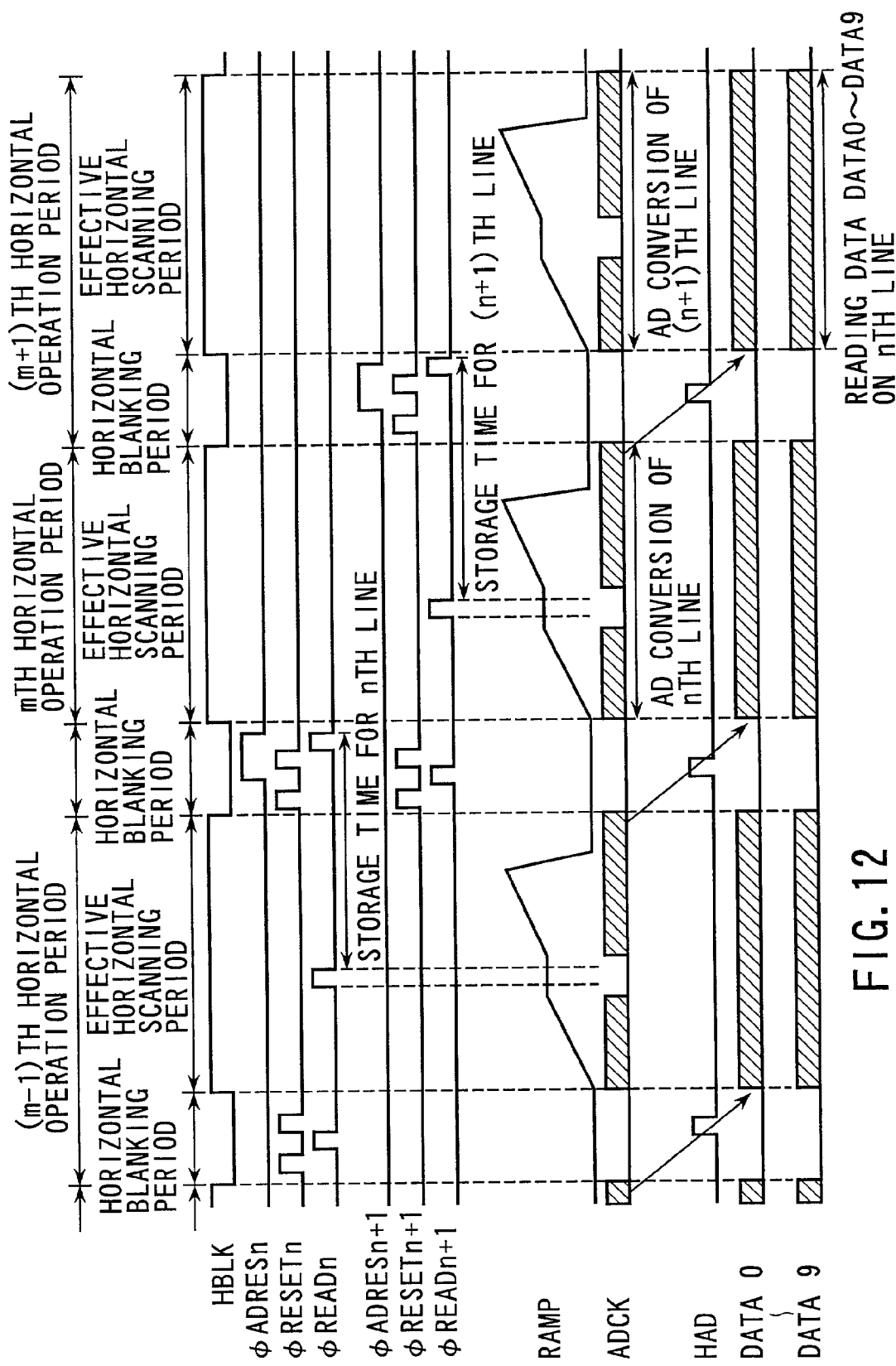
FIG. 12 is a timing waveform diagram showing one example of an operation of the CMOS image sensor of FIG. 11.
Figure 13:
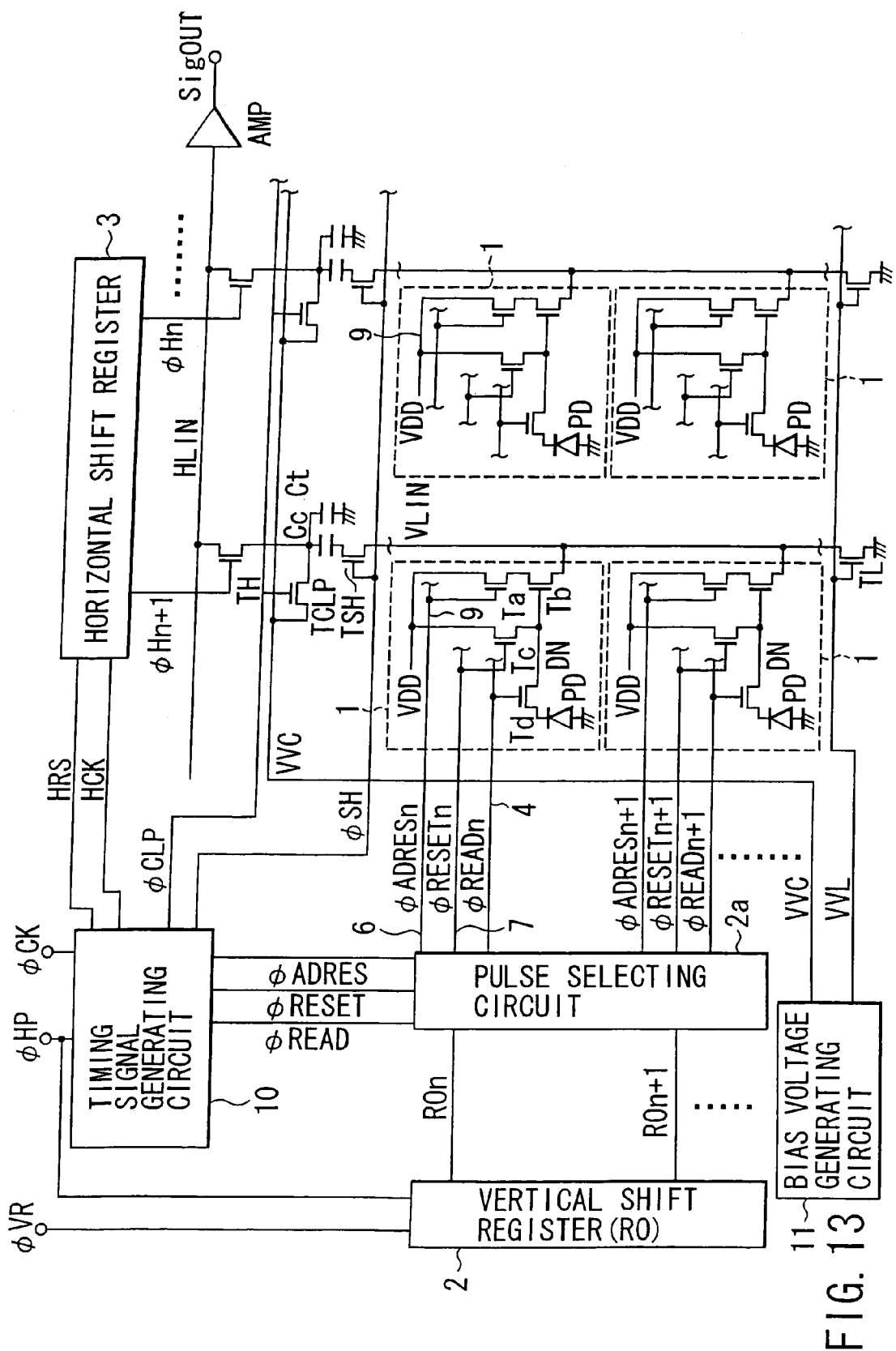
FIG. 13 is a circuit diagram showing a conventional amplification type CMOS image sensor.

FIG. 12 is a timing waveform diagram showing one example of the operation of the CMOS image sensor. Incidentally, in FIG. 12, in the same manner as the case shown in FIG. 6, in particular, there is shown a case in which a variable electronic shutter pulse signal φESPA is supplied from the outside, and the electronic shutter of less than electric charge accumulation time one horizontal blanking period (horizontal period) is conducted.

That is, in FIG. 12, time from the timing of the reading drive signal φREAD output to the horizontal scanning period of the (m+1)th horizontal period up to the signal reading timing in the horizontal period of the mth horizontal period immediately thereafter becomes the electric charge accumulation time of the photodiode of the predetermined pixel row (n lines). Up to the signal reading timing here, the signal voltage in which noise is cancelled by conducting a predetermined pixel row is generated within the CMP of each comparator of the A/D conversion circuit 21.

Subsequently, in the horizontal effective scanning period of the mth horizontal cycle, a voltage of a reference signal VREF output from the reference signal generation circuit on the basis of the horizontal synchronic signal HAD rises at a definite level, so that the comparator CMP is compared with the signal voltage for each of the pixel columns. Specifically, the comparator CMP conducts the timing in which two voltages are balanced on the basis of the count signal ADCK from the timing generation circuit, and the count value is latched as 10 bit digital data which is A/D converted.

After this, in the horizontal blanking period of the (m+1)th horizontal period, the latch data of the comparator CMP is input and held to the latch circuit LATCH with the latch data of the comparator CMP being synchronized with the horizontal synchronization signal HAD along with the reading of the accumulation electric load from the photodiode in the next line to be selected. Subsequently, in the horizontal effective scanning period of the (m+1)th horizontal period, the digital signal held by each of the latch circuit LATCH which is arranged in a horizontal direction is subsequently read to the output signal DATA0 through DATA9 via the switch circuit SW by the shift operation of horizontal shift register 3. Furthermore, the latch data of the comparator CMP is updated in accordance with the result of the comparison operation with the signal voltage of the line to selected and the voltage of the reference signal VREF from the reference signal generation circuit.

Incidentally, in FIG. 12, on the basis of the control of the count signal ADCK from the timing generation circuit 10, the operation of the A/D conversion circuit and the reference signal generation circuit is temporarily suspended all through the process before and after the input of the variable electronic shutter pulse signal φESPA. This is because it is thought that when the variable electronic shutter pulse signal φESPA is input in the horizontal effective scanning period, there is a fear that fluctuation in the power source voltage and in the ground voltage is generated, so that noise might jump into the analog signal.

For example, in the case of the CMOS image sensor shown in FIG. 1, one horizontal line portion of analog signal is subsequently read to the horizontal signal line HLIN in the horizontal effective scanning period. Here, when the pulse signal is supplied from the outside, there is a possibility that noise might jump into the analog signal as a result of the fluctuation in the power source voltage and in the ground voltage. On the other hand, in the CMOS image sensor shown in FIG. 11, the analog signal is A/D converted into a digital signal, and, then one horizontal line portion of the digital signal is read to the output signal lines DATA0 through DATA9 with the result that noise jumping into the analog signal owing to the fluctuation in the power source voltage and in the ground voltage can be virtually ignored. On the other hand, with respect to the analog signal before the A/D conversion, it becomes possible to avoid noise jumping owing to the fluctuation in the power source voltage and in the ground voltage by temporarily suspending the operation of the A/D conversion circuit and the reference signal generation circuit before and after the input of the electronic shutter pulse signal φESPA.

Incidentally, with respect to the CMOS image sensor shown in FIG. 1 which does not incorporate the A/D conversion circuit, it becomes possible to avoid the noise jumping owing to the fluctuation in the power source voltage and in the ground voltage at the time of the input of the electronic shutter pulse signal φESPA by providing a correction circuit for correcting the influence of the noise jumping into the analog signal and mixing the power source which is electrically separated, and a circuit block of ground voltage system. Furthermore, in each of the CMOS image sensor, each unit cell in the pickup region is not particularly restricted to one pixel/one unit comprising four transistors and one photodiode. In the image sensor, a unit cell of two pixels/one unit comprising five transistors and two photodiodes may be formed. Furthermore, as the unit cell, the configuration may be a laminated layer in which the photoelectric conversion circuit is laminated. The present invention can be put into practice through modification in various forms without departing from the gist of the present invention.

As has been described above, according to the solid-state imaging device of the present invention, the electronic shutter can be operated at a high speed in which the electric charge accumulation time is 1H (horizontal cycle) or less, and a favorable image can be obtained in which the high luminance side is not clipped in the environment in which the incident quantity is extremely large.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state imaging device comprising:
   a pickup region formed by a plurality of unit cells arranged in two dimensions of a plurality of pixel rows and a plurality of pixel columns on a substrate, each of the unit cells being provided with a photoelectric conversion circuit configured to accumulate an electric load by photo-electrically converting incident light to a pixel, reading circuit configured to read an accumulated electric load to a detection portion, and an amplification circuit configured to amplify an electric load which has been read;
   a plurality of reading lines provided in a horizontal direction corresponding to a plurality of pixels lines in the pickup region, each of the reading lines transmitting a reading drive signal of a plurality of unit cells of the corresponding pixel row;
   a vertical driving circuit configured to selectively drive the reading circuit by supplying the reading drive signal to the plurality of reading lines;
   a first row selection circuit configured to output a signal for selectively specifying a pixel row in the pickup region on the basis of a first pulse;
   a second row selection circuit configured to output the pixel row in the pickup region on the basis of a second pulse; and
   a plurality of vertical signal lines provided in correspondence to a plurality of pixel columns in the pickup region to transmit a signal output from the unit cell of each pixel row in a vertical direction;

wherein the vertical driving circuit drives two or more times the reading circuit of the unit cell of the pixel row selected in the pickup region on the basis of an output signal from the first row selection circuit and the second row selection circuit.

2. The solid-state imaging device according to claim 1, wherein the first pulse and the second pulse are generated in mutually different phases in a horizontal blanking period.

3. The solid-state imaging device according to claim 1, wherein the second pulse is formed of a phase fixed pulse generated in the horizontal blanking period and a phase variable pulse generated in the horizontal effective scanning period.

* * * * *

UNITED STATES PATENT AND TRADEMARK OFFICE
CERTIFICATE OF CORRECTION

| | | |
|---|---|---|
| PATENT NO. | : 6,999,120 B1 | Page 1 of 1 |
| APPLICATION NO. | : 09/680968 | |
| DATED | : February 14, 2006 | |
| INVENTOR(S) | : Egawa et al. | |

It is certified that error appears in the above-identified patent and that said Letters Patent is hereby corrected as shown below:

On the title page, the Terminal Disclaimer information should be deleted. Item (45) and the Notice information should read as follows:

TITLE PAGE
--[45] Date of Patent: Feb. 14, 2006

[*] Notice: Subject to any disclaimer, the term of this
patent is extended or adjusted under 35
U.S.C. 154(b) by 1038 days. --

Signed and Sealed this

Twenty-eighth Day of November, 2006

JON W. DUDAS
*Director of the United States Patent and Trademark Office*